US005694561A

United States Patent [19]
Malamud et al.

[11] Patent Number: 5,694,561
[45] Date of Patent: Dec. 2, 1997

[54] METHOD AND SYSTEM FOR GROUPING AND MANIPULATING WINDOWS

[75] Inventors: Mark Malamud; Erik A. Gavriluk; David Barnes; Russell Johnson; J. Alison Grauman, all of Seattle, Wash.

[73] Assignee: Microsoft Corporation, Redmond, Wash.

[21] Appl. No.: 353,717

[22] Filed: Dec. 12, 1994

[51] Int. Cl.$^6$ .................................................. G06F 3/14
[52] U.S. Cl. ........................ 395/346; 395/356; 395/342
[58] Field of Search .............................. 395/157, 159, 395/156, 158, 155, 161, 340, 346, 342, 339, 332, 356, 683, 682; 345/119, 120

[56] References Cited

U.S. PATENT DOCUMENTS

| | | | |
|---|---|---|---|
| 4,907,174 | 3/1990 | Priem | 395/122 |
| 5,065,347 | 11/1991 | Pajak et al. | 395/348 |
| 5,305,435 | 4/1994 | Bronson | 395/351 |
| 5,349,658 | 9/1994 | O'Rourke et al. | 395/349 |
| 5,353,398 | 10/1994 | Kitahara et al. | 395/332 |
| 5,442,795 | 8/1995 | Levine et al. | 395/800 |
| 5,459,825 | 10/1995 | Anderson et al. | 395/133 |
| 5,479,599 | 12/1995 | Rockwell et al. | 395/349 |
| 5,499,334 | 3/1996 | Staab | 395/340 |
| 5,564,002 | 10/1996 | Brown | 395/340 X |
| 5,572,649 | 11/1996 | Elliott et al. | 395/340 |

OTHER PUBLICATIONS

Cowart, "Mastering Windows 3.1", Sybex, 1993, pp. 14–16, 72–96, 479.

Microsoft Corporation, "User's Guide Microsoft® Excel Version 5.0", pp. 12–14, 77–92, 1993.

Microsoft Corporation, "Programmer's Guide Microsoft® Visual Basic™ Programming System for Windows™ Version 3.0", pp. 15–30, 111–121, 1993.

Microsoft Corporation, "Getting Started with Microsoft Windows, Microsoft® Windows™ Version 3.1", pp. 30–36, 1992.

Microsoft Corporation, "User's Guide, Microsoft® Windows™ Version 3.1", pp. 71–89, 1992.

Microsoft Corporation, "Programmer's Reference vol. 1: Overview, Microsoft® Windows™ Version 3.1", pp. 266–268, 365–375, 1992.

Microsoft Corporation, "Programmer's Reference vol. 4: Resources, Microsoft® Windows™ Version 3.1", pp. 59–65, 1992.

Microsoft Corporation, "Programmer's Reference vol. 2: Functions, Microsoft® Windows™ Version 3.1", pp. 303–305, 901–905, 1992.

Petzold, Charles, "A New Multiple Document Interface API Simplifies MDI Application Development", *Microsoft Systems Journal*, vol. 5, No. 4, pp. 53–63, Jul. 1990.

Microsoft Corporation, "The Windows™ Interface An Application Design Guide, Microsoft® Windows™ Version 3.1", pp. 50–54, 1992.

Microsoft Corporation, "Guide to Programming, Microsoft® Windows™ Version 3.1", pp. 499–510, 1992.

Microsoft Corporation, "Programmer's Reference vol. 3: Messages, Structures, and Macros, Microsoft® Windows™ Version 3.1", pp. 253, 314–315, 1992.

*Primary Examiner*—Raymond J. Bayerl
*Assistant Examiner*—Crescelle N. dela Torre
*Attorney, Agent, or Firm*—Seed and Berry LLP

[57] ABSTRACT

A method and system for grouping and manipulating windows in a window system is provided. In a preferred embodiment, a plurality of displayed windows are grouped into a project group. A project group has associated information regarding which windows belong to the project group, an associated project group appearance for differentiating the windows in the project group from other windows, and a set of project group commands for operating upon the project group. A window is designated as a project group folder, this window containing indicators to the other windows belonging to the project group. For each window belonging to the project group, project group commands are added to menus of the windows belonging to the project group. Later, when a window is activated and a project group command selected for operating upon the project group, certain behaviors occur. For example, when the project group command is a request to close the project group, the current state of each window in the project group is saved and each window is displayed according to the closed state of the window. Also, for example, when the project group command is a request to open the project group, then each window in the project group is displayed according to its previously saved state.

47 Claims, 14 Drawing Sheets

METHOD AND SYSTEM FOR GROUPING AND MANIPULATING WINDOWS

TECHNICAL FIELD

The present invention relates generally to a computer system with windows and, more specifically, to a method and system for grouping windows and manipulating them in the computer system.

BACKGROUND OF THE INVENTION

A window system displays windows on a computer system display device. In conventional window systems, a user has limited ability to manipulate a group of windows together. Typically, if the user wishes to open multiple windows, the user selects an icon for an application program that the user wishes to execute and invokes an Open command. The Open command causes a window to be opened for the application program. These systems typically require the user to perform this procedure for each application program the user wishes to use. Due to this time-consuming and laborious procedure, such prior window systems present inefficient environments for a user who desires to manipulate a group of windows.

In some prior systems, the underlying window system supports the ability to restore windows to some prior state on computer system power-up. The prior state was saved when the computer system was last powered down. Typically, these window systems automatically save and restore all displayed windows; the user is not able to designate a particular group of windows to save or restore.

SUMMARY OF THE INVENTION

The limitations of prior systems are overcome by the present invention, which is an improved method and system for grouping and manipulating windows. In a preferred embodiment, windows are grouped into a project group for operating upon them as an aggregate. The project group maintains information regarding which windows belong to the project group. Upon receiving a request to operate upon the project group, each window in the project group is operated upon accordingly. Specifically, upon receiving a request to close the project group, the current viewing state of each window belonging to the project group is saved, and the window state is set to the closed state. Also, upon receiving a request to open the project group, the current state of each window belonging to the project group is reset to the saved state.

In another embodiment, the present invention provides the ability to designate a window as a project group folder, bestowing certain behaviors on the window. In another embodiment, the invention provides a way to distinguish the project group windows from other windows by displaying a project group appearance on the windows belonging to a project group. One skilled in the art will recognize that this invention is sufficiently general to work with any window operation that can be used to manipulate more than one window at the same time.

DETAILED DESCRIPTION OF THE INVENTION

Embodiments of the present invention provide a method and system for grouping and manipulating windows in a window system. For the purposes of this application, a window is an area on a computer display screen that is allocated to and managed by a particular program or task (or an object in an object-oriented environment) and that has at least one component. The components that typically comprise a window are scroll bars, menus, a title bar, an application display area, and other such components. Many of these components are provided by the underlying window system, and which components are provided depends upon the type of window created. In addition, the underlying window system or the program, task, or object that manages the window provides an icon, which can be used to represent the window when the window is minimized or closed.

According to the present invention, a user groups windows by incorporating them into a project group. The project group maintains information regarding which windows belong to the project group and provides a special set of project group commands for managing the windows belonging to the project group. In addition, when project group windows are displayed, they are displayed with a special project group appearance that serves to differentiate the windows belonging to the project group from other displayed windows that do not belong to the project group. Once windows have been grouped into a project group, all of the windows in the project group can be manipulated in a single operation. Thus, the present invention provides an efficient way to manipulate a set of windows related only by the fact that a user or program has chosen to manipulate them as an aggregate. Those skilled in the art will appreciate that the present invention can be used in contexts other than those discussed above.

In a preferred embodiment, the methods and systems of the present invention are implemented on a computer system comprising a central processing unit, a memory, a display, and other input/output devices. A copy of a window system resides in the computer system memory and is used by the computer system to manage windows on the display. The window system can be part of the operating system or a stand-alone application program. The present invention is realized by the window system.

Figure 1:
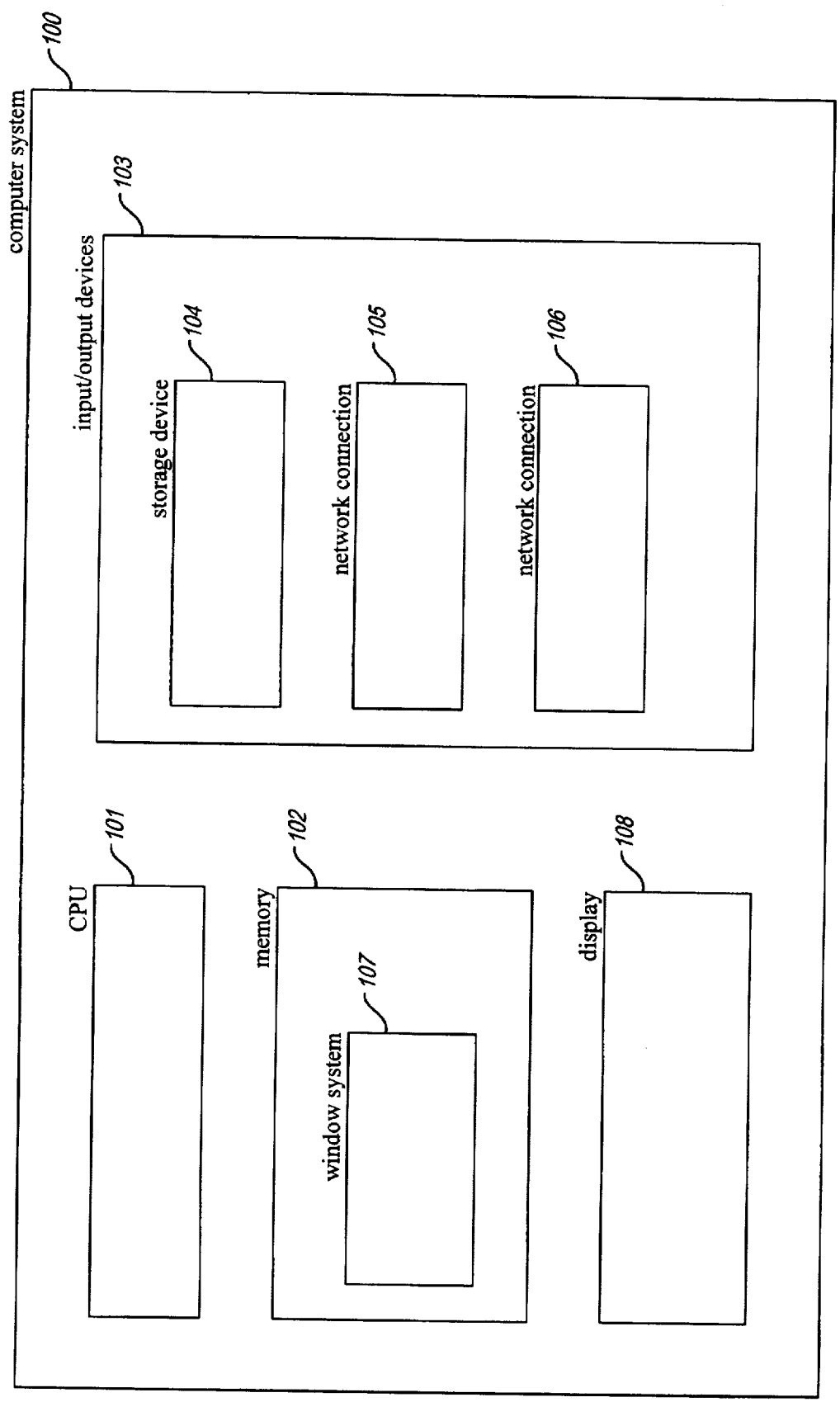
FIG. 1 is a block diagram of a general purpose computer system for practicing a preferred embodiment of the present invention.

FIG. 1 is a block diagram of a general-purpose computer system for practicing a preferred embodiment of the present invention. The computer system 100 contains a central processing unit (CPU) 101, a computer memory (memory) 102, a display 108, and input/output devices 103. Among the input/output devices is a storage device 104, such as a hard disk drive, and two network connections 105 and 106. Each network connection can provide access to other resources on the network including other computers. The window system 107, as well as other associated programs, preferably reside in the memory 102 and execute on the CPU 101. The window system 107 manages windows on the display 108. One skilled in the art will realize that the present invention can be implemented in a distributed environment, where more than one computer system is used to communicate with other computer systems.

In a preferred embodiment, a window managed by the window system has viewing states, such as an open state, a closed state, a maximized state, and a minimized state. Table 1 summarizes the window characteristics and program behaviors associated with these different viewing states. A window also has a current state which represents a viewing state and reflects the current appearance of the window and the state of the program responsible for managing the window. "Program" is used here to refer generically to code, whether it is executed as a thread or an independent task. As shown in Table 1, when the current state of a window is the open state, the window is typically displayed in its default form on a display device. Typically, the program responsible for managing the window is placed in a running state (it is executed). When the current state of a window is the closed state, the program responsible for managing the window is no longer running, and the window is typically represented by an icon on the display. When the current state of a window is the maximized state, the window typically occupies the entire visible area of the display device. When the current state of a window is the minimized state, the window is typically represented by an icon or a reduced version of the window; however, the program responsible for managing the window is still running.

TABLE 1

| Viewing State | Window Displayed | Program Running |
| --- | --- | --- |
| open | yes | yes |
| closed | no | no |
| maximized | yes | yes |
| minimized | no | yes |

In one embodiment, a project group is a relationship among windows. A project group is implemented as a property (a settable and retrievable characteristic) of a window associated with a folder object. A window associated with a folder object may be designated as a project group by setting the project folder property. A folder object is a container, which is an object that can contain other objects. A folder object is represented on the display by a folder window which contains representations of the objects contained by the folder object. These other objects are represented by icons or by additional windows, when the folder object is activated. Although this description uses the word "object" to describe the elements displayed by the window system, the present invention can be implemented in a traditional window system, an object-oriented environment, or in a variety of other window environments. One skilled in the art will recognize that a project group may be realized in alternate embodiments as a property of some other object other than a window. For example, in an object-oriented environment, a project group property may be implemented as a property of the folder object itself (and not of its window).

When a folder window has its project folder property set, the windows and icons representing the objects contained within the folder object are considered to belong to the project group. A folder window with its project folder property set is referred to as a project group folder. A user creates a project group by incorporating windows or icons into an already existing project group folder, or by incorporating them into a folder window and then designating the folder window as a project group. Thus, in this embodiment, the project group relationship mirrors the physical containment relationship: the windows and icons representing the objects physically contained in the folder object are logically part of the project group created by making a folder window into a project group folder.

Once a project group has been created, the user can perform operations on all of the project group windows in a single operation, thereby increasing the user's efficiency in working with a set of windows. For example, the user can open all of the windows belonging to a project group by invoking an "Open Project" command on a selected project group window. Also, the user can close all of the windows belonging to a project group by invoking the "Close Project" command. Upon closing the project group, the current viewing states of the windows are saved. Upon later opening the project group, the viewing states of project group windows can be restored to the viewing states saved before the project group was closed. Other window manipulation operations work similarly, allowing the user to save the viewing states of particular windows and to restore them as desired.

Figure 2:
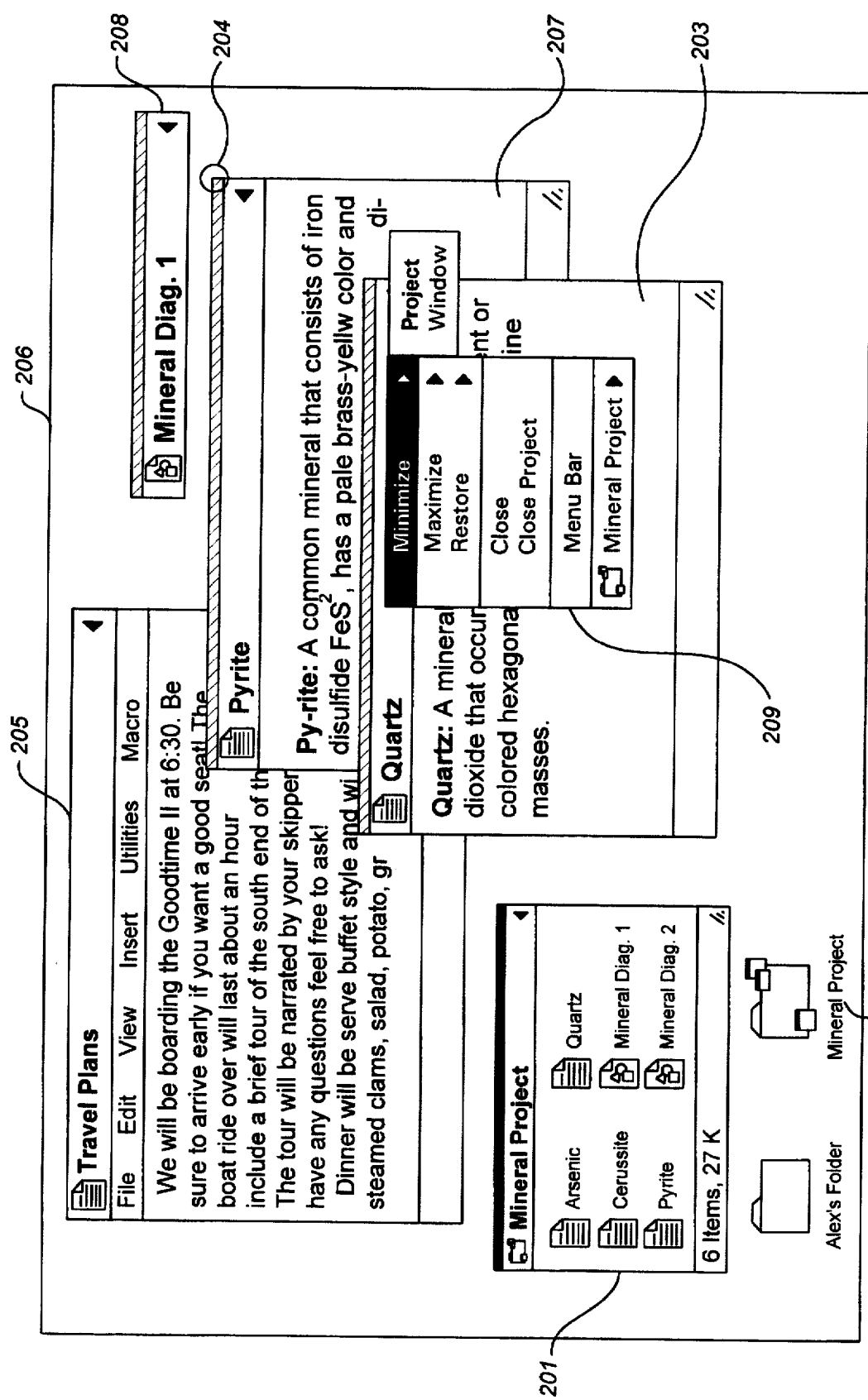
FIG. 2 is an example of a display containing windows belonging to a project group.

Before discussing in detail how project groups are created and used, it is helpful to examine how project groups appear on a display. FIG. 2 is an example of a display containing windows belonging to a project group. The example display 206 shows four open windows 201, 203, 207, and 208, which belong to a project group entitled "Mineral Project." The example display 206 also shows an open window 205, which does not belong to the project group, and two icons at the bottom of the display. Icon 202 represents the Mineral Project folder window 201. The Mineral Project folder window 201 contains representations of six objects, three of which have been opened and whose contents are shown in the open windows 203, 207, and 208. The three open windows belonging to the Mineral Project project group are displayed with a project group appearance to differentiate these open windows from the open windows not belonging to the project. For example, the windows belonging to the Mineral Project project group, 201, 203, 207, and 208, are shown with an additional horizontal border 204 at the top of the window. One skilled in the art will appreciate that a variety of ways exist to differentiate the appearance of windows belonging to a project group. For some examples, color coding, text notations, or attachments in different shapes (other than a horizontal bar) may be added to the windows. Window 205 is not part of the project group and has no special project group appearance. Thus, window 205 is not shown as one of the objects contained within the Mineral Project folder window 201.

Certain behaviors result from creating a project group. For example, when the project folder property of a folder window is set, the folder window (the project group folder) is associated with a special icon. The special icon may be used by the window system to represent the folder window in particular viewing states. In the example displayed in FIG. 2, project group icon 202 is the special icon for the folder window 201. Also, when a window becomes part of a project group, additional project group-related commands are added to various menus associated with the window. For example, window 203 is shown with a title bar menu 209, which contains special commands for accessing all of the windows in the project group. For example, menu 209 contains a "Minimize Project" command, which allows a user to minimize all the windows of the Mineral Project project group. Adding project group commands to various menus is discussed further below.

Figure 3:
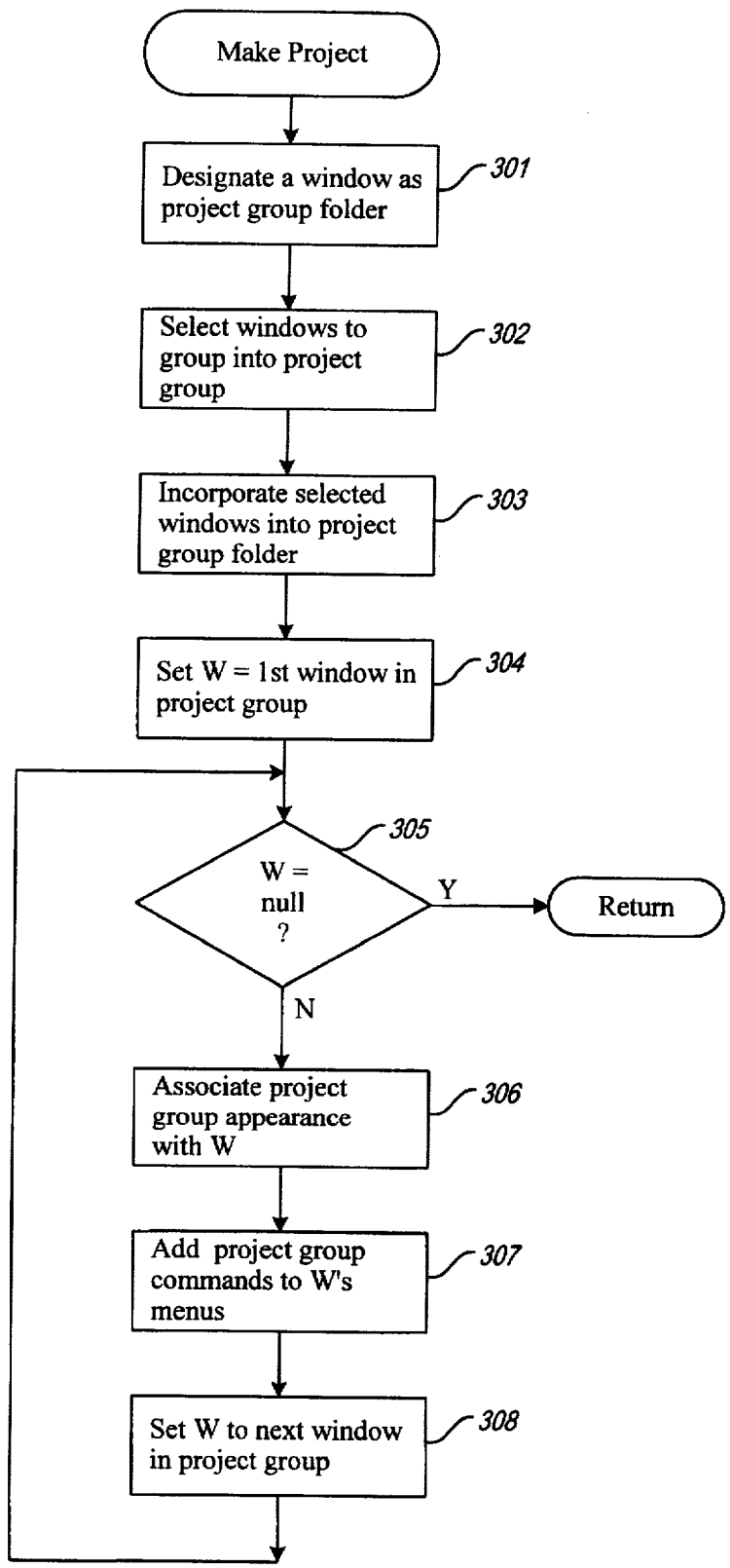
FIG. 3 is an overview flow diagram of the steps performed to create a project.

FIG. 3 is an overview flow diagram of the steps performed to create a project group. In summary, the user selects the windows that the user desires to include in the project group and, in response, the code that implements these steps incorporates the selected windows into a project group folder associates each incorporated window with the project group appearanc adds project group commands to the menus of each incorporated window. What particular code implements these steps is dependent on the type of underlying system. For example, in a window system that supports interprocess communication and drag-drop direct manipulation using an input device such as a computer mouse, the program that manages the contents of the selected window might communicate directly with the program that manages the contents of the project group folder to effect incorporation of the selected window into the project group folder. Alternatively, the underlying window system might control all of the steps and keep track of the windows associated with each project group, sending messages to their associated programs as appropriate.

In step 301, one of the windows is designated as a project group folder. The various ways to perform this designation are discussed further below. In step 302, windows are selected for inclusion in the project group. In step 303, these windows are incorporated into the previously designated project group folder window. The incorporation of these windows is discussed further below. In steps 304, 305, 306, 307, and 308, a loop is performed associating each window with a project group appearance and adding project group commands to the appropriate menus. When a window belonging to the project group is later displayed according to its open state, the window is displayed with the project group appearance. Associating each window with project group behavior is discussed further below. Specifically, in step 304, the routine sets a temporary variable to point to the first window belonging to the project group. In step 305, if this temporary variable points to nothing, then the routine returns, otherwise it continues in step 306. In step 306, the routine associates the window pointed to by the temporary variable with the project group appearance. In step 307, the routine adds project group commands to the menus of the window pointed to by the temporary variable. In step 308, the temporary variable is reset to point to the next window belonging to the project group, and the routine returns to the beginning of step 305.

Figure 4:
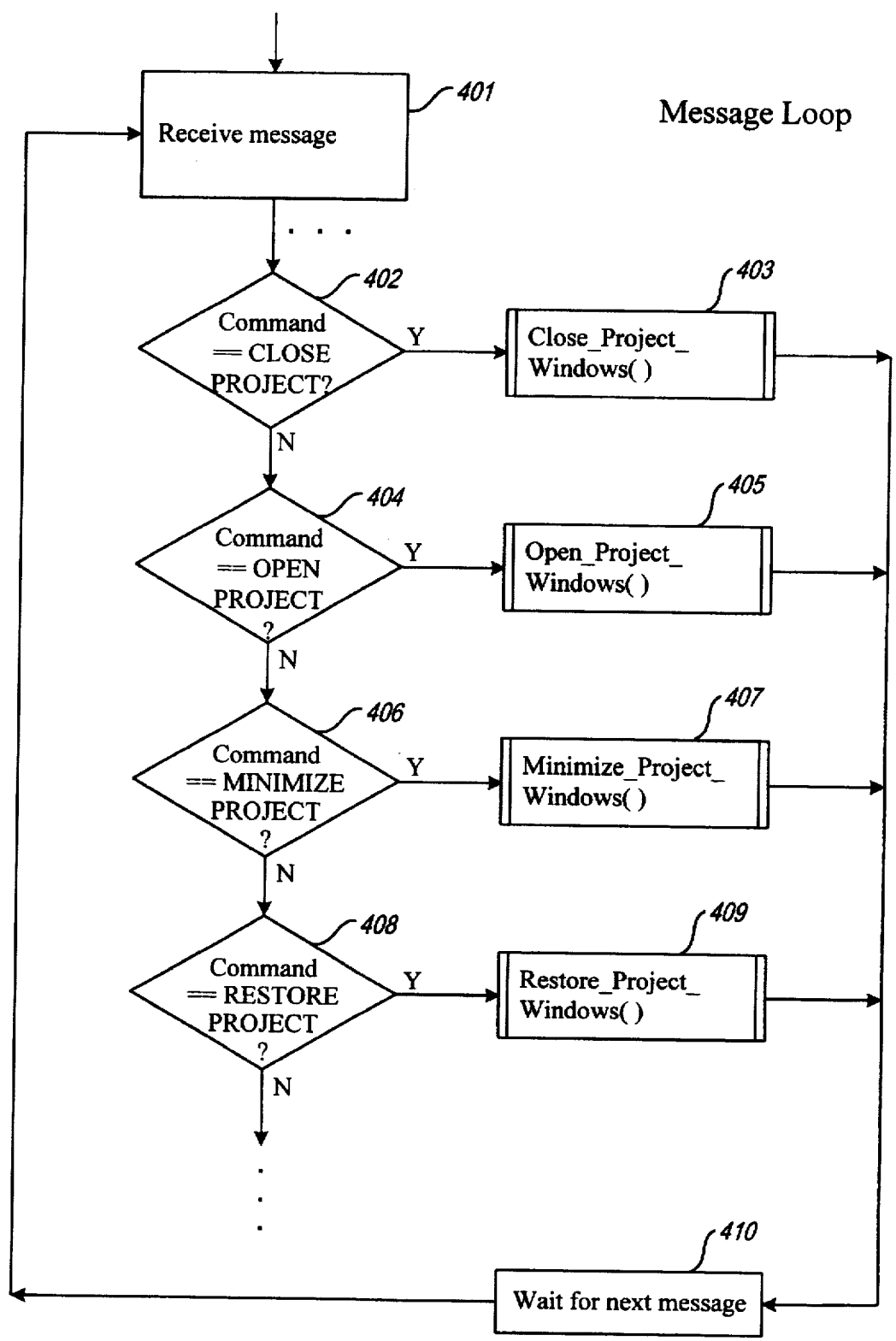
FIG. 4 is a flow diagram of a message loop for processing project group commands.

Once a project group has been created, the user manipulates the windows in the project group by selecting commands from the menus of the open windows or from icons. FIG. 4 is a flow diagram of a message loop for processing project group commands. FIG. 4 illustrates a typical message loop for a typical message-driven (event-driven) program. The message loop responds to four commands: Close Project, Open Project, Minimize Project, and Restore Project. One skilled in the art will realize that many other commands are applicable for manipulating windows as a group, and that a variety of semantics for these commands are possible. In step 401, the program receives a message, for example when a user selects a menu item. In steps 402, 404, 406, and 408, the message loop determines which command was selected. In steps 403, 405, 407, and 409, the message loop invokes the appropriate routine to respond to the user-selected command. More specifically, in step 402, the message loop determines whether the selected command is the Close Project command, and if so continues at step 403, else continues at step 404. In step 403, the message loop invokes the routine Close_Project_Windows, and continues at step 410. In step 404, the message loop determines whether the selected command is the Open Project command and, if so, continues at step 405, else continues at step 406. In step 405, the message loop invokes the routine Open_Project_Windows and continues at step 410. In step 406, the message loop determines whether the selected command is the Minimize Project command and, if so, continues at step 407, else continues at step 408. In step 407, the message loop invokes the routine Minimize_Project_Windows and continues at step 410. In step 408, the message loop determines whether the selected command is the Restore Project command and, if so, continues at step 409, else continues with determining whether the command is another command the message loop can respond to. In step 409, the message loop invokes the routine Restore_Project_Windows and continues at step 410. Then, in step 410, after the message is handled, the message loop waits for the next message, and the process begins again by continuing at step 401.

Creating a Project Group

A user or an application can create a project group using a variety of techniques. These techniques involve creating and designating a project group folder and incorporating a group of windows (or icons) into the project group folder. A project group folder can be created by cloning an existing project group folder, by using a template object to clone a freshly initialized project group folder, by creating or using an existing folder window and setting its project folder property, or by using an application programming interface ("API") routine or a user command to create a project group folder. One skilled in the art will realize that this list of techniques is not exhaustive and depends upon the capabilities of the underlying window system.

Project group folders can be created by cloning another project group folder or a template object. In an object-oriented environment, objects are often created by cloning them from template objects. A template object is an instance of an object of a particular type (or class, to use object-oriented nomenclature). The cloning procedure typically involves a user selecting a template object from a collection of template objects and invoking a command requesting the system to create a newly initialized copy of this template object. Alternatively, any object instance may be used as a template object if the underlying window system supports the duplication of objects. An object cloned by duplicating an existing (non-template) object may acquire additional state (as opposed to being newly initialized).

Project group folders can also be created by setting the project folder property associated with a folder window. Using this technique, either a folder window already exists and the project folder property is set when a user or program wants to use the folder window as a project group folder, or a new folder window is created and the project folder property is set at creation time. One skilled in the art will recognize that there are a variety of ways to maintain and set window or object properties, and that any choice is based upon the capabilities and architecture of the underlying window system. In one embodiment, the project folder property, like other window properties, is set by a user through a dialog box and by a program through a set property function, provided as part of the API.

Figure 5:
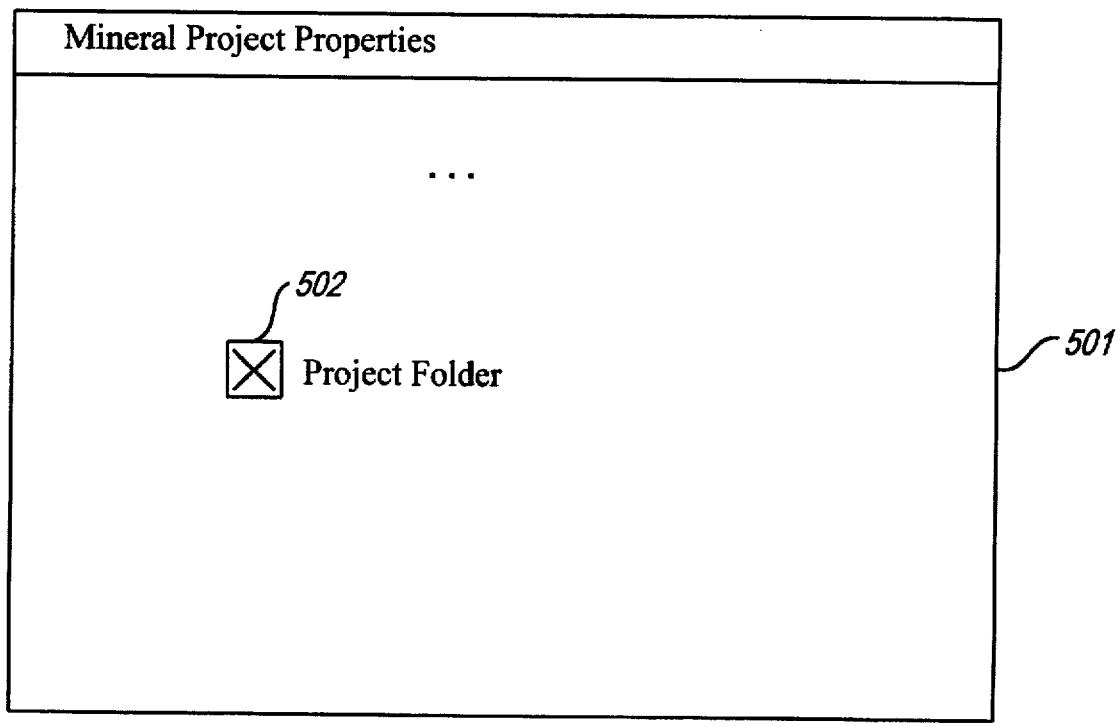
FIG. 5 is an example dialog box for setting the project folder property of a folder window.

FIG. 5 is an example dialog box for setting a project folder property of a folder window. Dialog box 501 is a property setting dialog box corresponding to the Mineral Project folder window 201 shown in FIG. 2. Item 502 is a check box associated with the project folder property for this folder window. When the check box 502 is turned on, as is indicated in FIG. 5, the project folder property is set and the corresponding folder window is considered a project group folder. If the check box 502 is turned off, then the project folder property is not set and the corresponding folder window is not considered a project group folder. Although other folder window properties are typically settable in a similar fashion, they are not shown in FIG. 5 as they are not necessary to explain a preferred embodiment of the present invention.

One skilled in the art will recognize that several techniques can be used to implement the creation of project group folders by setting a project folder property. In one embodiment, the underlying system defines a system resource, for example, a project. (Resources are system supported data structures such as menus, icons, and dialog boxes.) Several API routines are then provided by the system for creating a project resource, creating a folder window associated with a project resource, adding a window or icon to an already existing project, and for setting the project group to be "active." A project group is considered active if the windows contained in the project group folder window are to be treated as a project group. When a project group is active, active status is reflected in the project resource to enable the underlying system (e.g., the window manager) to known when to draw the windows associated with the project resource with the project group appearance and commands. Using these API routines, a project group folder can be created and associated with a project resource.

Figure 6:
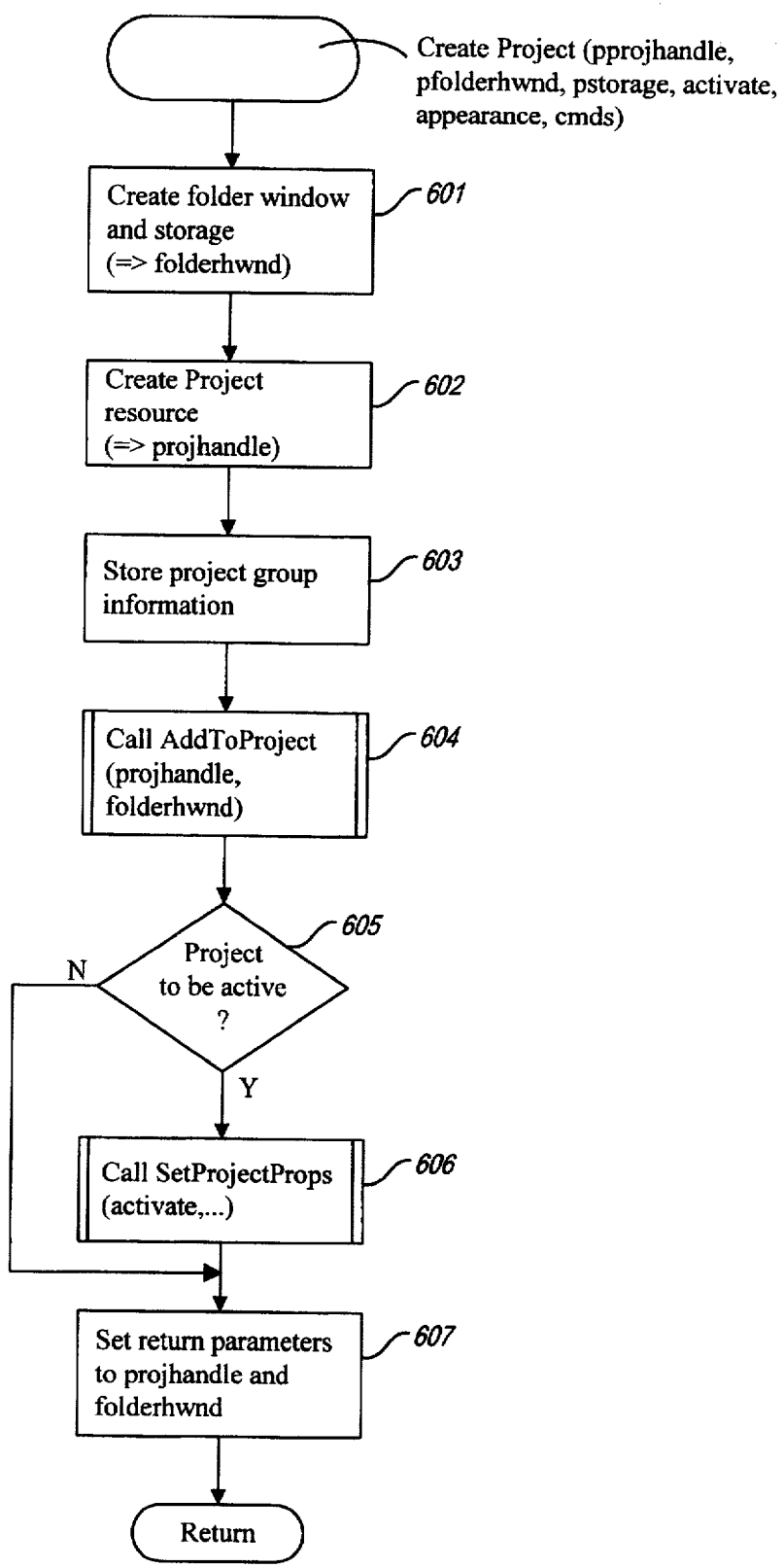
FIG. 6 is a flow diagram of the routine CreateProject.

Specifically, according to one embodiment, all folder windows are created using a CreateProject API routine, whether or not the folder window is to be an active project group. In this manner, a project resource is allocated for each folder window created, in case the folder window later becomes a project group folder by setting the project folder property. FIG. 6 is a flow diagram of the routine CreateProject. In summary, the CreateProject routine creates a folder window, allocates a project resource, stores any supplied information regarding the project group appearance for the project group to be created, calls a routine to add the folder window to the project group (associated with the project resource), and returns a handle to the created folder window and a handle to the allocated project resource. If the CreateProject routine is invoked to create an active project group, then a routine is called to set the project group status to active, which causes the folder window to be displayed with project group appearance and project group commands.

Specifically, in step 601, the CreateProject function creates a folder window and allocates whatever storage is needed. In step 602, the function creates a project resource and in step 603 stores the project group information that is provided by input parameters. In step 604, the function calls the AddToProject routine to add the created folder window to the project resource. In step 605, the function determines whether the calling program has requested that the project group be made active and, if so, continues in step 606, else continues in step 607. In step 606, the function calls the SetProjectProps function to change the active status of the project group to be active. In step 607, the function sets the output parameter indicating the project resource handle to the newly created project resource and the output parameter corresponding to the folder window handle to the newly created folder window and returns.

Once created, a folder window that is not part of an already active project group can become a project group folder (making the project group active) by setting its project folder property. In response, the code responsible for managing the folder window calls the underlying system supplied routine, SetProjectProps (shown as step 606 in FIG. 6), to request the system to make the folder window into an active project group. All of the windows and icons representing the objects contained within the associated folder object automatically become part of that project group and are given project group appearance and commands.

One technique for giving newly opened windows project behavior is to launch programs (e.g., by opening their icons) from a project group folder using a system supplied command, for example, ShellExecuteFromProject. This command adds the launched program to the project resource (e.g., using AddToProject) to enable the underlying system to know that, when the program later opens it own windows, they should be associated with project behavior if the project group is active. Because only the underlying window system is aware when the windows are opened, the system needs to keep track of what programs are members of the project group. The system stores this information in the project resource associated with the project group folder. (The program managing the folder window, once it has launched a program, no longer has any control over the actions performed by the launched program.)

Giving project group behavior to already opened windows of executing programs is more complicated. One skilled in the art will recognize that a variety of techniques exist for implementing this behavior. For example, all programs can be coded to accept a new window message to draw project appearance. When the project folder property is set on a folder window, the program managing the folder object (and the folder window) can send this window message to the programs managing all of the objects contained in the folder object to redraw themselves with project appearance. The program associated with each contained window and icon is also added to the project resource at this time (if it was not added earlier when the containment was initially established) to enable later created windows to display project group behavior. However, a new window message technique will not work for programs that have not been coded to understand the message. In these instances, a simple technique is to restrict displaying project group behavior until the currently opened windows are later reopened from the folder window after the project folder property has been set.

When new project group folders are created from scratch using the CreateProject routine, then windows or icons are selected and incorporated into the project group folder if the project group is to contain more than one window. In a preferred embodiment, windows and icons can be selected and then moved, copied, or linked into the project group folder. For example, a user can use an input device, such as a mouse, to move, copy, or link windows or icons into the project group folder using direct manipulation techniques.

Specifically, using the mouse, the user selects a window and drags it into the project group folder by holding down a button on the mouse. The code responsible for managing the contents of the project group folder receives these mouse events and interprets them as instructions to add the selected windows or icons to the project group (e.g., using the AddToProject routine to add the program that manages the window or icon to the project resource). One skilled in the art will recognize that a variety of techniques are available for incorporating windows into a project group folder. Any technique for selecting and moving, copying, or linking selected objects into a container object can be used. The code that implements the project group folder is typically responsible for keeping track of the windows and icons that are part of the project group.

In addition to creating project group folders by setting the project folder property, project group folders can be created through a special user command for creating a project group. According to this scheme, a user uses any available window mechanism to select a set of windows or icons and then invokes a "Create Project" command. In one embodiment, in response to this command, the window system presents a list of existing project group folders and an option to create a new project group folder. Once the user selects a project group folder, the selected windows are then incorporated (moved, copied, or linked) into that existing project group folder. Otherwise, if the new project group folder option is selected, then the window system creates a new project group folder according to the techniques described above and incorporates the windows selected by the user into the project group folder. Assuming an embodiment where folder windows have storage implications, then when these windows or icons are incorporated, they become logically contained in the folder object storage hierarchy. One skilled in the art will recognize that a variety of semantics and techniques for implementing such a user command are possible.

Project group folder windows can also be created by programs through a window system supplied API routine. In one embodiment, the routine allows a program to specify all the information necessary to create a project group folder including supplying a list of window identifiers that identify which windows (or their associated programs) to incorporate into the project group folder. Alternatively, several routines can be defined to separate the creation step from the incorporation step. Referring to the example described with reference to setting a project folder property, the CreateProject routine provides the creation step and the AddToProject routine provides the incorporation step. The ability to create project group folders programmatically implies that any user interface can be added to the system to create project groups as long as such a user interface utilizes the programmatic interface.

Once a project group folder is created or a folder window becomes a project group folder by setting the project folder property, certain behaviors are associated with the project group folder and the other windows belonging to the project group. First, a project group appearance (for example, the horizontal bar 204 in FIG. 2), is associated with each window including the project group folder. When the windows belonging to the project group are displayed in their open state, they are displayed with the project group appearance. Techniques for associating and displaying project group appearance when a window is displayed in the open state are discussed further below. In addition, the icons displayed to represent windows in their minimized state can also have a project group appearance. Also, if a window that is already in an open state is incorporated into a project group, then that window is also given the project group appearance. In a preferred embodiment, an open window is given the project group appearance using the same techniques discussed earlier with respect to creating an active project group by setting the project folder property on a folder window that contains windows currently in their open states.

A second behavior associated with the windows belonging to a project group is that the project group folder is responsible for keeping track of the programs that manage the other windows belonging to the project group. One skilled in the art will recognize that there are a variety of techniques that can be used to implement this behavior, and that these techniques depend upon the underlying environment capabilities. For example, in one embodiment the program responsible for managing the folder window can maintain a list of the contained objects. In a message-driven environment, when a project group command is selected, this program sends (broadcasts) an appropriate message to the programs associated with all of the objects on this list. The programs associated with each of these objects is then responsible for performing the desired operation on its associated windows (or folder object). (This technique is used in FIGS. 9, 10, 11, 12, and 13 discussed below.) In another embodiment, the list of the contained windows and icons is kept as a property of the folder window (or folder object). In yet another embodiment, a registration routine (e.g., AddToProject) is provided by the underlying window system. This routine keeps track of the contained objects and the underlying window system invokes the appropriate operation on the program associated with each object. This centralized control technique is useful in window systems that do not support the ability for one program to send directly to another program messages pertaining to window manipulation.

Figure 7:
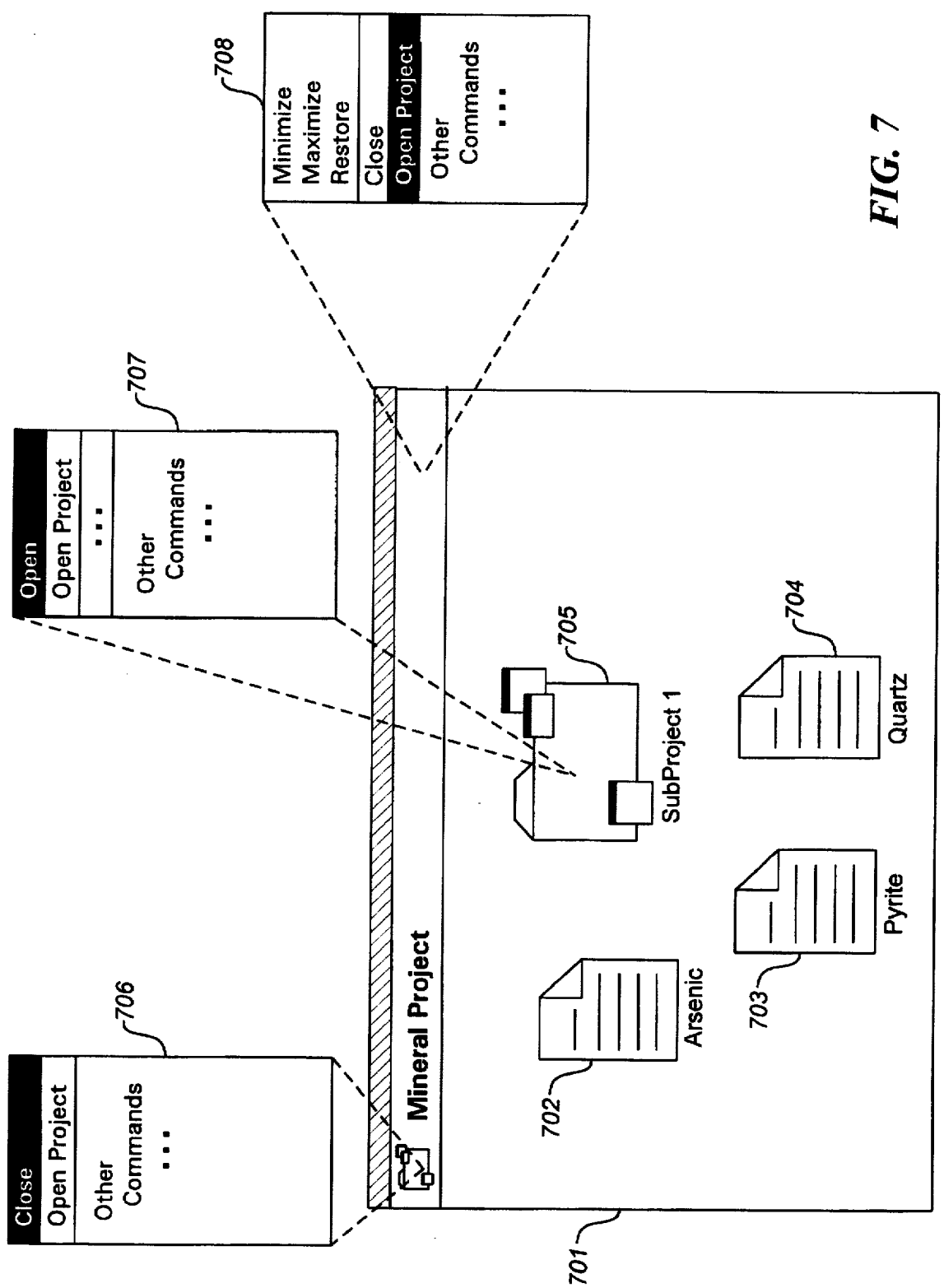
FIG. 7 is a block diagram of the project group commands added to the menus of a project group folder window.
Figure 8:
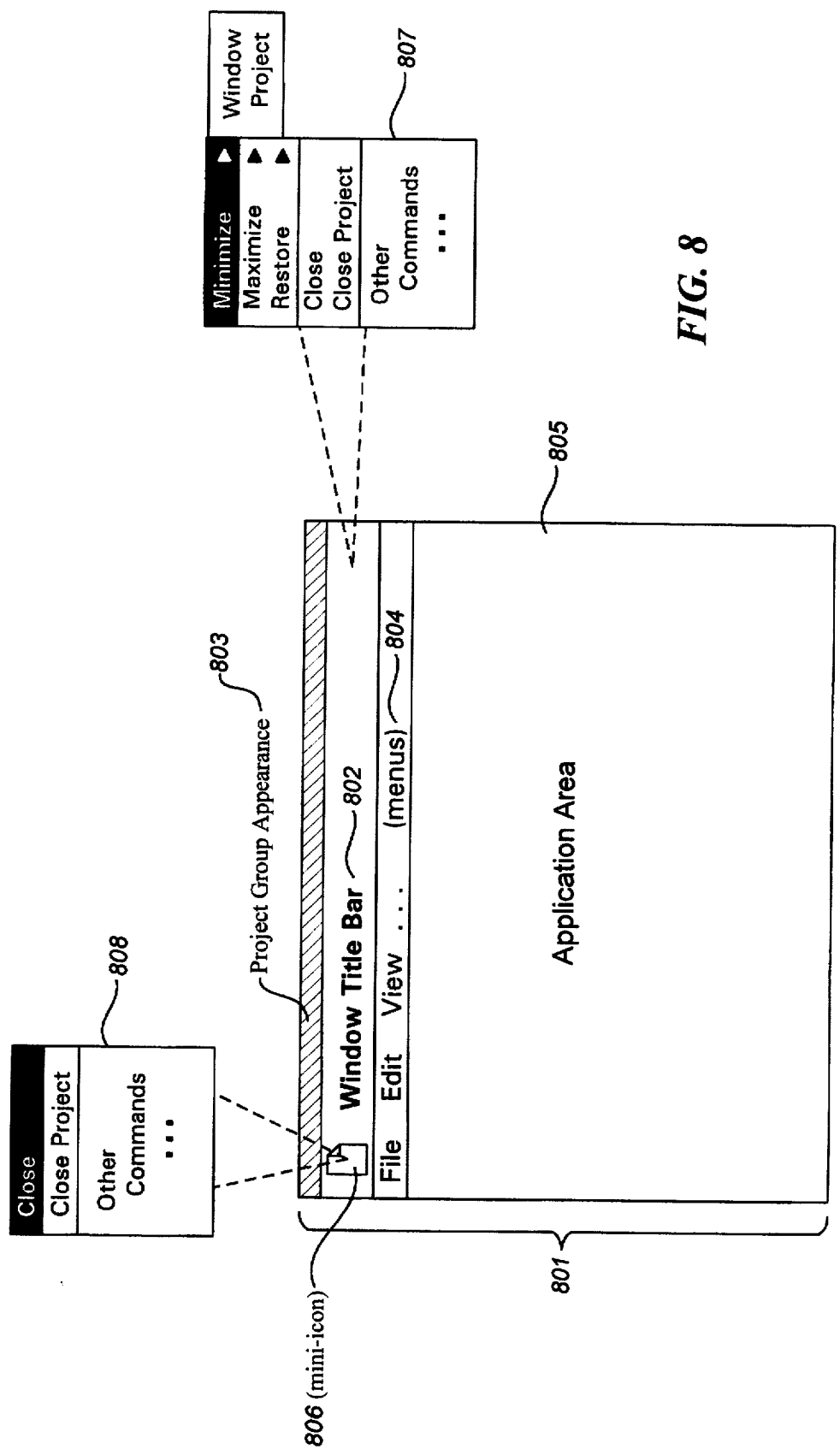
FIG. 8 is a block diagram of the project group commands added to a window in open state that belongs to a project group.

A third behavior that is associated with the windows belonging to a project group is that project group commands are added to the appropriate menus. FIGS. 7 and 8 are block diagrams showing typical changes made to the menus.

FIG. 7 is a block diagram of the project group commands added to the menus of a project group folder. The Mineral Project folder window 701 is shown in an open state and contains four objects 702, 703, 704, and 705. Although the folder window 701 is in an open state, the Mineral Project project group as it is displayed has not been activated by, for example, an Open Project command. Objects 702, 703, and 704 have associated windows that are in their closed state; thus, there are no open windows displayed for these objects. Instead, they are represented by icons. Object 705 is a project group contained within the Mineral Project group (a sub-project group). Project group 705 is a closed project group.

Project group 705 has an associated context menu 707, which can be used by the user to either open the folder window associated with project group 705 or to open all of the windows associated with project group 705, including the folder window. The "Open" and "Open Project" commands shown as part of the context menu 707 have been added to accomplish this behavior. In a typical window system, API routines are provided for adding menu items to a menu and for deleting menu items from a menu. (For example, the Microsoft Windows 3.1 system provides the routines InsertMenu and DeleteMenu for accomplishing these tasks.)

Similarly, the Mineral Project folder window 701 has an associated mini-icon menu 706 and a title bar context menu 708. Each of these menus has been updated to reflect a user's ability to either close the currently open folder window or to open all of the other windows belonging to the project group. For example, if the "Open Project" command is selected from menus 706 or 708, then the windows associated with objects 702, 703, 704, and 705 are displayed according to their last saved states. If the project group was previously closed when objects 702, 703, 704, and 705 had open windows, then these windows are displayed according to their open states with project group appearance. Otherwise, the windows are displayed according to their closed states. Note that other semantics are possible for the Open Project and Close Project commands, including behavior that all windows would be opened regardless of their saved state when a user selects the Open Project command. Once the project group has been opened, the "Open Project" menu item is changed to a "Close Project" menu item. The default action for the mini-icon menu 706 and the title bar context menu 708 is to perform the project group related operation.

As shown in FIG. 7, project groups can contain other project groups. For example, project group 705 in FIG. 7 is a sub-project group within the Mineral Project group. The implementation techniques for a sub-project group are the same as for the project group that contains the sub-project group; a sub-project group is a project group. Various semantics for sub-project groups are possible. For example, in one embodiment, when a project group is opened, only the top level windows belonging to the project group are opened. Therefore, for any sub-project group, only the folder window corresponding to the sub-project group is opened. Alternatively, in another embodiment using different semantics, when a project group is opened, all of the windows belonging to the project group are recursively opened. In this scenario all of the windows belonging to any sub-project groups are opened. One can analogously define semantics for other project group operations.

FIG. 8 is a block diagram of the project group commands added to a window in open state that belongs to a project group. This figure exemplifies how the windows associated with objects 702, 703, 704, and 705 in FIG. 7 appear on the display when a user opens the Mineral Project group using the "Open Project" command and these windows are restored to their open states. Window 801 contains a project group appearance component 803, an application area 805, a title bar 802, a menu bar 804, and a mini-icon 806. From the mini-icon 806, a user can invoke the mini-icon menu 808. The mini-icon menu 808 has been updated to allow a user to close all of the windo to the project group, including window 801, or to just close window 801. From the title bar 802, a user can invoke the title bar context menu 807. The title bar menu 802 has been updated to allow a user to invoke all of the window manipulation commands on either window 801 or on all of the windows belonging to the project group. For example, if the user chooses "Minimize Project" using the cascading menu entry, then all of the windows belonging to the project group are minimized, including window 801. The default action for both menus is to perform these operations on window 801 only, and not on all of the project group windows, in order to be consistent with windows not belonging to a project group.

Manipulating Project Group Windows as a Single Entity

Preferred embodiments of the present invention allow project group windows to be manipulated in a single operation, thereby increasing user efficiency. As discussed above with reference to FIG. 4, in a message-driven (event-driven) window system, the program responsible for managing each window has a message loop which responds to messages (events) by determining which message was sent and then invoking the proper routine to handle the message. In the preferred embodiment of the present invention, when a user selects project group commands, the program managing the window notifies (directly or indirectly) all of the other windows in the project group so that their managing programs can appropriately respond to the command. One skilled in the art will recognize that multiple variations of notification techniques are possible. In one embodiment, the program that received the message (if not associated with the project group folder) forwards the message to the program that manages the project group folder to let it control the operation on the entire group of windows. In an alternate embodiment, the program that manages the window that received the message controls the operation and forwards the request to the program that manages each window in the project group including the project group folder. Both of these embodiments assume an implementation on a window system that supports generalized message passing, where one program can request another to open or close its windows. Also, the latter technique requires that the program that manages each window has access to the project group folder's list of windows belonging to the project group. In the embodiment described earlier that uses a project resource to hold such information, a program can obtain the list of open windows (and programs) belonging to a project group by querying the underlying system. (Alternatively, the program that manages each window could be responsible for keeping a current list of all the other windows in the project group.)

In yet another alternate embodiment, the underlying window system maintains centralized control and is responsible for broadcasting the message to all of the programs that manage windows belonging to the project group. One technique for implementing this embodiment is to provide underlying window system support for the menus that are used to select the group operations. In addition, a mechanism is provided when a program is executed to inform the window system of the project group to which its windows belong (e.g., ShellExecuteFromProject). Thereafter, when a user selects a group related menu item from this system provided menu, the window system detects what other windows belong to the same project group and notifies their corresponding programs accordingly. This technique is useful in environments that do not support the ability for one program to request another to open and close its windows.

For example, in a Microsoft Windows 3.1 implementation the mini-icon menu and the title bar context menu (706 and 708 in FIG. 7) are provided by the underlying window system. When a program (corresponding to a window belonging to the project group of interest) is launched from a project group folder, the window system is informed that the program's windows should be associated with that project group. The window system then stores this information as part of the data for the executed program. Later, in response to the user's selection from the system provided menus of commands that affect windows within the project group, the window system broadcasts the appropriate information to the programs that implement other windows contained in the same project group. One technique used to determine the set of windows to notify is to query each window to determine its parent window. Those windows without a parent window or those that have been created with the underlying desktop as their parent window are referred to as top-level windows. Once a top-level window is detected, the window system determines whether that window belongs to the particular project group folder of interest by examining the data it has previously stored in the project resource that corresponds to the window whose menus were selected. Then, the window system notifies each top-level window that is contained within the project group of interest.

FIGS. 9, 10, 11, 12, and 13 illustrate an embodiment using the first technique, where the program managing the project group folder is responsible for controlling the flow of a group operation. Each of the illustrated routines assume that the underlying window system supports the ability for one program to directly send a message to another program to request it to operate on its windows in a specific manner. These figures represent typical operations for manipulating windows, but are not the only operations available for manipulating project groups. One skilled in the art will recognize that window operations that can be performed on more than one window at the same time can operate as project group operations.

Figure 9:
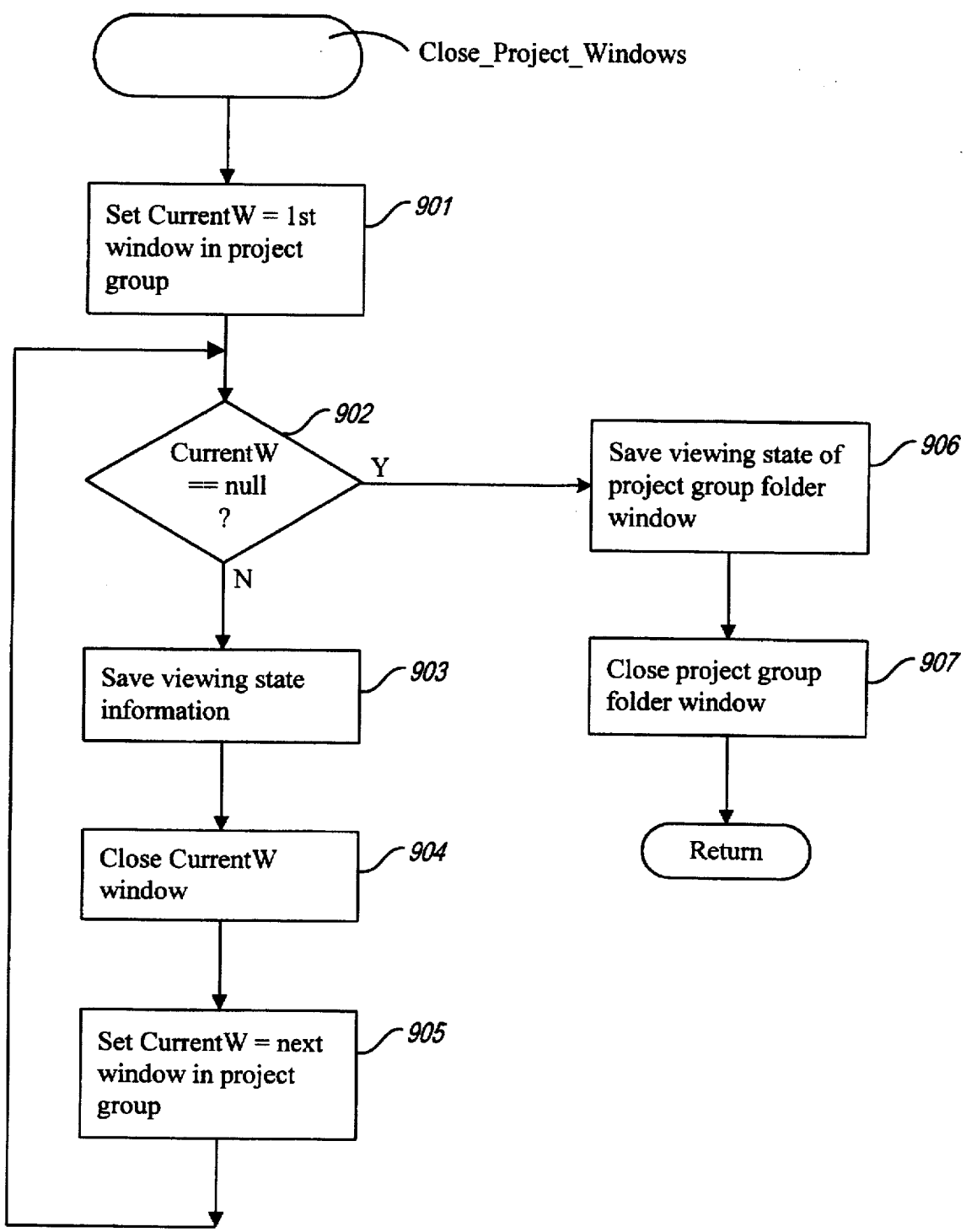
FIG. 9 is a flow diagram of the routine Close_Project_Windows.

FIG. 9 is a flow diagram of the routine Close_Project_Windows. This routine is called by the message loop of the code managing a project group folder in response to a "Close Project" command. The routine saves the viewing state information for all of the windows belonging to the project group, including the project group folder, and then closes all of the windows belonging to the project group. (The saving of viewing state information is discussed further below.) Recall that each project group folder is responsible for maintaining a list of all of the other windows in the project group or can enumerate such a list from the underlying system when needed. In step 901, the routine sets a temporary pointer to point to the first window on this list of project group windows. In steps 902, 903, 904, and 905, the routine loops through this list and, for each window, saves the current viewing state information and closes the window. The current viewing state is the viewing state that corresponds to the current running state of the program managing the window and the current display state of the window. Specifically, in step 902, the routine determines whether there are any more windows in the project group, and if not (the list of project group windows is empty) continues at step 906, else continues at step 903. In step 903, the routine saves the current viewing state information for the window pointed to by the temporary pointer. In step 904, the routine closes the window pointed to by the temporary pointer and, in step 905, updates the temporary pointer to point to the next window on the list of project group windows. The routine then loops back to step 902 to process the next window on the list. Once the list is exhausted, in step 906, the routine saves the viewing state information of the project group folder. In step 907, the routine closes the project group folder and returns.

Figure 10:
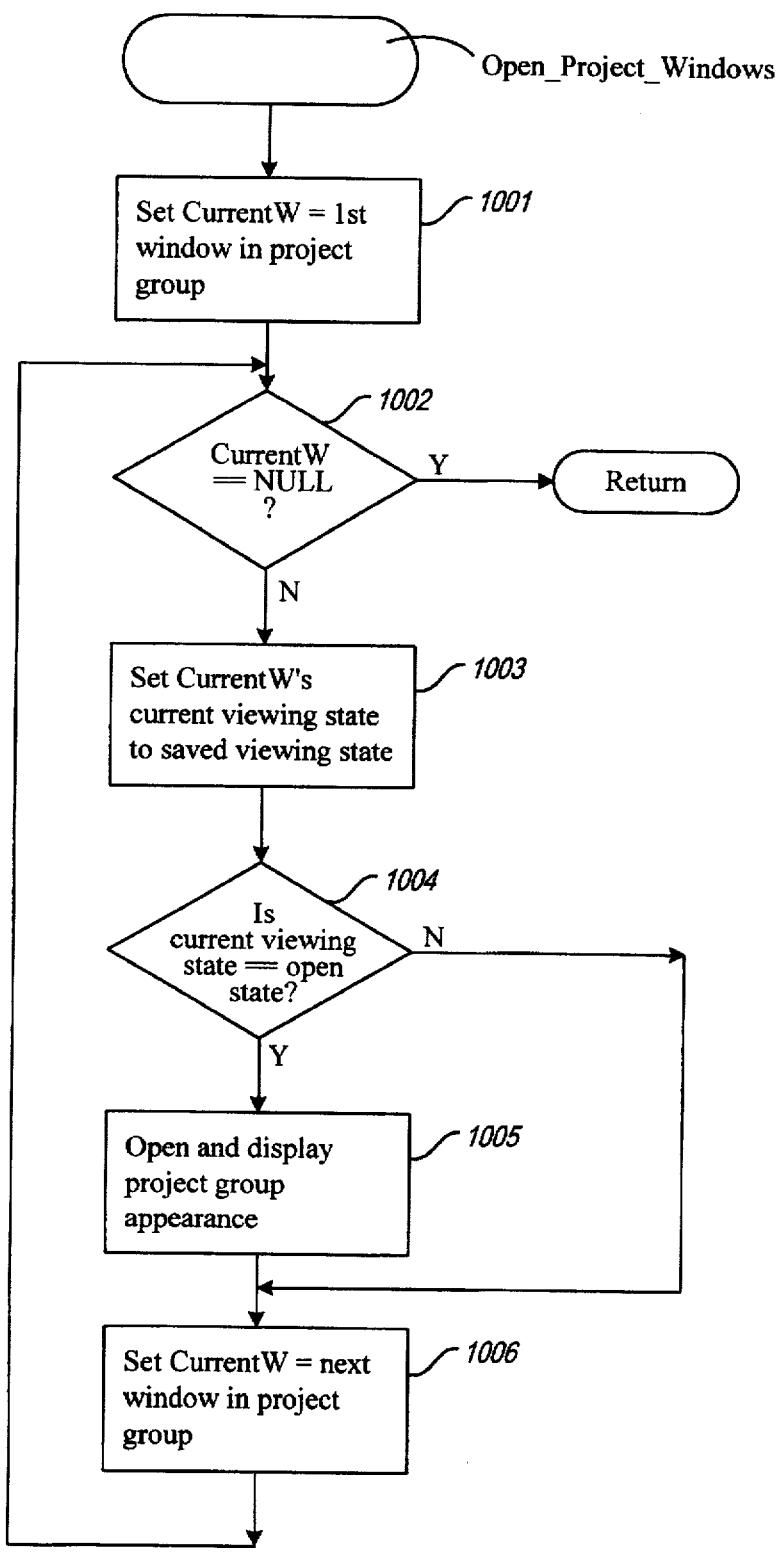
FIG. 10 is a flow diagram of the routine Open_Project_Windows.

FIG. 10 is a flow diagram of the routine Open_Project_Windows. This routine is invoked by the message loop of the program managing a project group folder in response to an "Open Project" command. This routine opens the project group by setting each of the windows belonging to the project group to the viewing state last saved (by either the Close_Project_Windows routine or any other routine that saves viewing state information). When a window is displayed according to its open state, the window is displayed with the project group appearance. In step 1001, the routine sets a temporary variable to point to the first window in the list of windows belonging to the project group. In steps 1002, 1003, 1004, 1005, and 1006, the routine loops through this list and, for each window, sets the viewing state to its previously saved viewing state. Specifically, in step 1002, the routine determines whether there are any more windows on the list of windows belonging to the project group and, if not, returns, else continues at step 1003. In step 1003, the routine sets the current viewing state of the window pointed to by the temporary variable to the previously saved viewing state. In step 1004, if the current viewing state is equivalent to the open state, then in step 1005 the routine displays the window as an open window with the project group appearance. Otherwise, the routine continues at step 1006. In step 1006, the routine sets the temporary variable to point to the next window on the list of project group windows and returns to the beginning of the loop (step 1002). Once the list is exhausted, the routine returns.

One skilled in the art will recognize that multiple techniques exist for saving and handling viewing state information. Typically, viewing state information is saved in the computer memory. Additionally, this information may be stored in a more persistent medium such as on a hard disk drive. The specific techniques for saving and handling viewing state information vary based upon whether state information is stored and maintained on a per desktop basis or a per user basis. In either case, a program that manages the window can store this information itself, or the information can be stored and accessed through a central location. For example, viewing state information can be stored in a known file location indexed by program name and accessed through API using standard file access mechanisms for obtaining and setting the information. (For example, one could use the "get" and "write" profile string API supported in the Microsoft Windows 3.1 system)

Also multiple techniques are available to store, associate, and display a project group appearance when a window belonging to the project group is displayed in open state. One such technique involves defining a particular window type to indicate that a window belongs to a project group and having the underlying window system automatically support specific behaviors for windows created with that window type. For example, in one embodiment the window system supports a project group window type by means of setting the window type to "project" when the window is designated as a project group folder. In accordance with this technique, the window system stores a common project group appearance in memory or stores a unique project group appearance for each project group and stores an indicator of this unique appearance with the project group folder. Then, when the window system displays a window of an object that is contained in a window of window type "project," the window system automatically displays the appropriate project group appearance. This technique works well with a window system that supports specific types or styles of windows where the project group appearance is specified or is the same for all project groups and where the program can be coded to invoke a routine to display its windows with project group appearance when they are contained in a window of window type "project."

Alternatively, in a window system that does not impose particular styles of windows, a program is responsible for drawing the window components that constitute a window's "style." Here window style refers to the particular types of borders around windows, menu bars, title bars, and other user controls. In a window system that does not impose particular window styles, a program can implement a project group appearance by storing and maintaining its own information. When the program receives a message to redraw the window, the program uses the stored project group appearance information to display the project group appearance in the same manner it displays other components of the window's style.

Another technique involves that use of a specialized command (e.g., ShellExecuteFromProject) to inform the window system when a program that is associated with an object belonging to a project group is launched. Using this command, the program that manages the contents of the project group folder can request the window system to execute a particular program and associate any windows created with this project group. In response, the window system stores this information as part of the running state of the executed program. Later, when the executing program creates windows, the window system can look up the project group appearance associated with the project group to which the executing program windows belong (in the project resource) and can automatically display the appropriate appearance. One advantage of this technique is that the executing program need not be aware that it is executing as part of a project group. One skilled in the art will recognize a variety of techniques are available and that the choice of technique depends upon the underlying window system.

Figure 11:
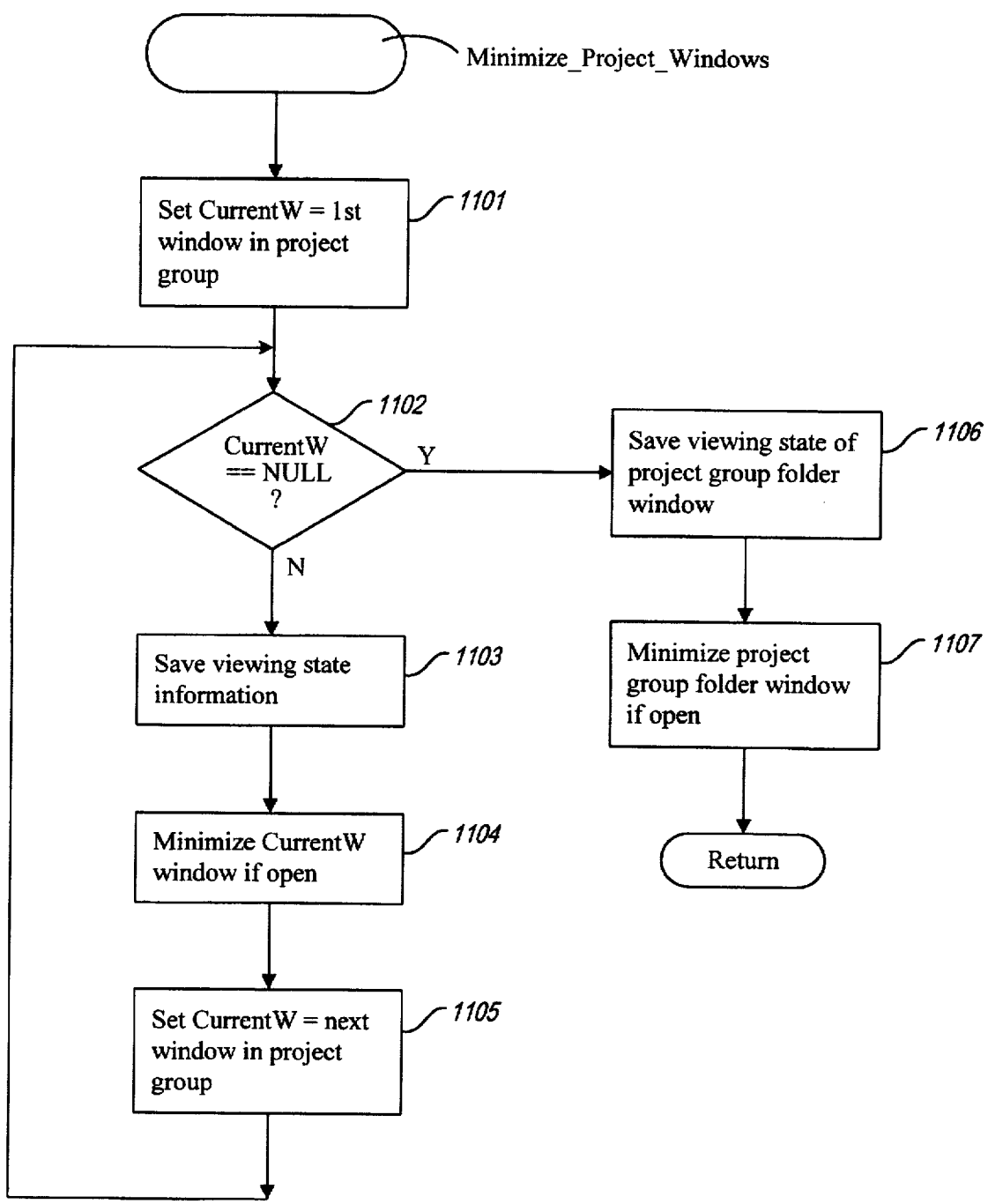
FIG. 11 is a flow diagram of the routine Minimize_Project_Windows.

FIG. 11 is a flow diagram of the routine Minimize_ Project_Windows. This routine is invoked by the message loop of the code managing the project group folder in response to the "Minimize Project" command. This routine works analogously to the Close_Project_Windows routine, except that it minimizes all of the open windows in the project group, including the project group folder, instead of closing the windows. Specifically, steps 1101, 1102, 1103, 1105, and 1107 work similarly to the correspondingly numbered steps in FIG. 9. Unlike the corresponding steps in FIG. 9, step 1104 minimizes the window pointed to by the temporary variable if it is currently in an open state and step 1107 minimizes the project group folder window if it is currently in an open state.

Figure 12:
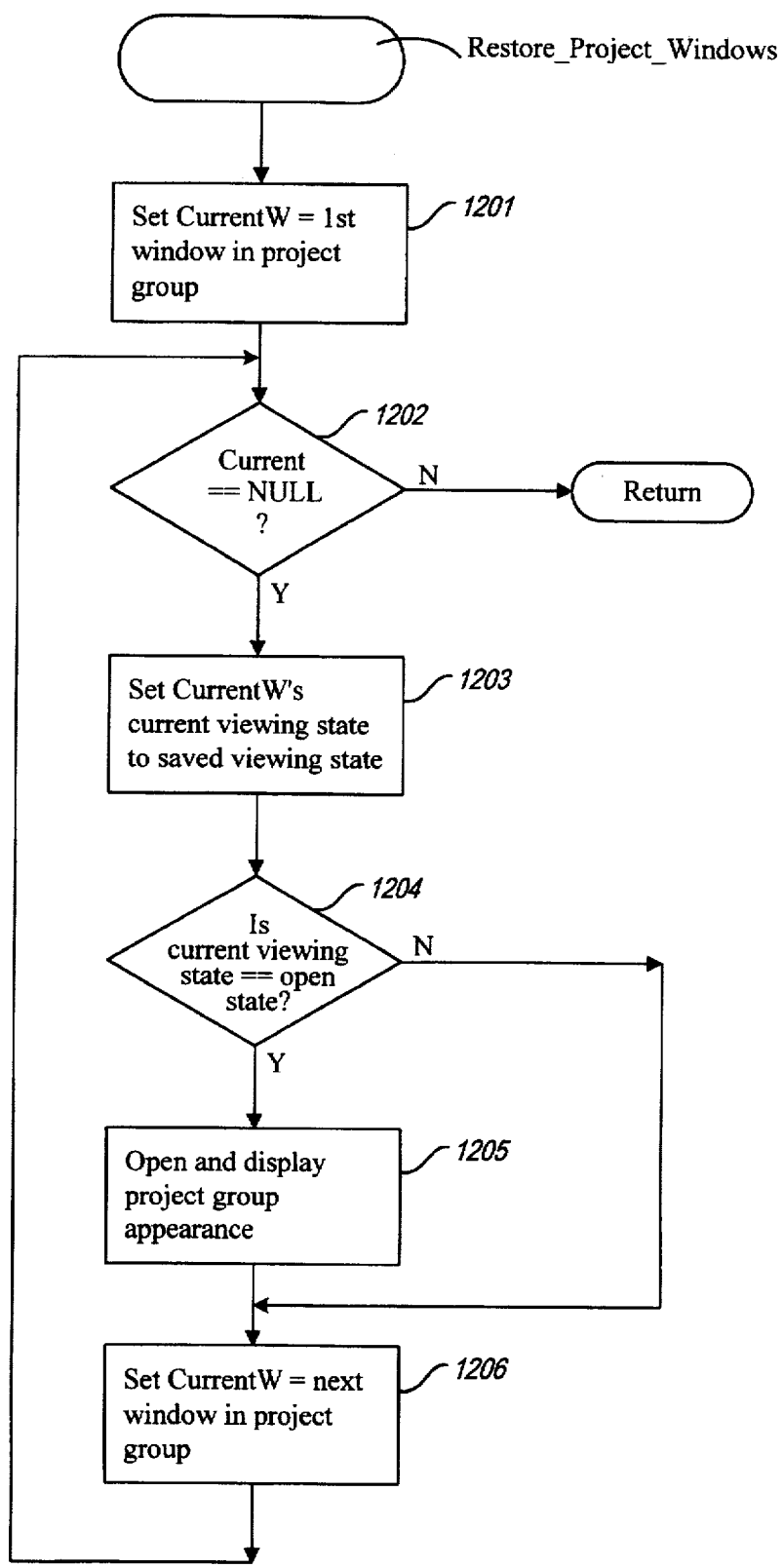
FIG. 12 is a flow diagram of the routine Restore_Project_Windows.

FIG. 12 is a flow diagram of the routine Restore_ Project_Windows. This routine is invoked by the message loop of the code managing the project group folder in response to the "Restore Project" command. In one embodiment, this routine works analogously to the Open_ Project_Windows routine. Specifically, in this embodiment as shown in FIG. 12, all of the steps of this routine work similarly to the correspondingly numbered steps in FIG. 10. In an alternate embodiment, different viewing state information are saved in response to different project group commands. The "Restore Project" and "Open Project" commands then restore windows to possibly different viewing states.

Figure 13:
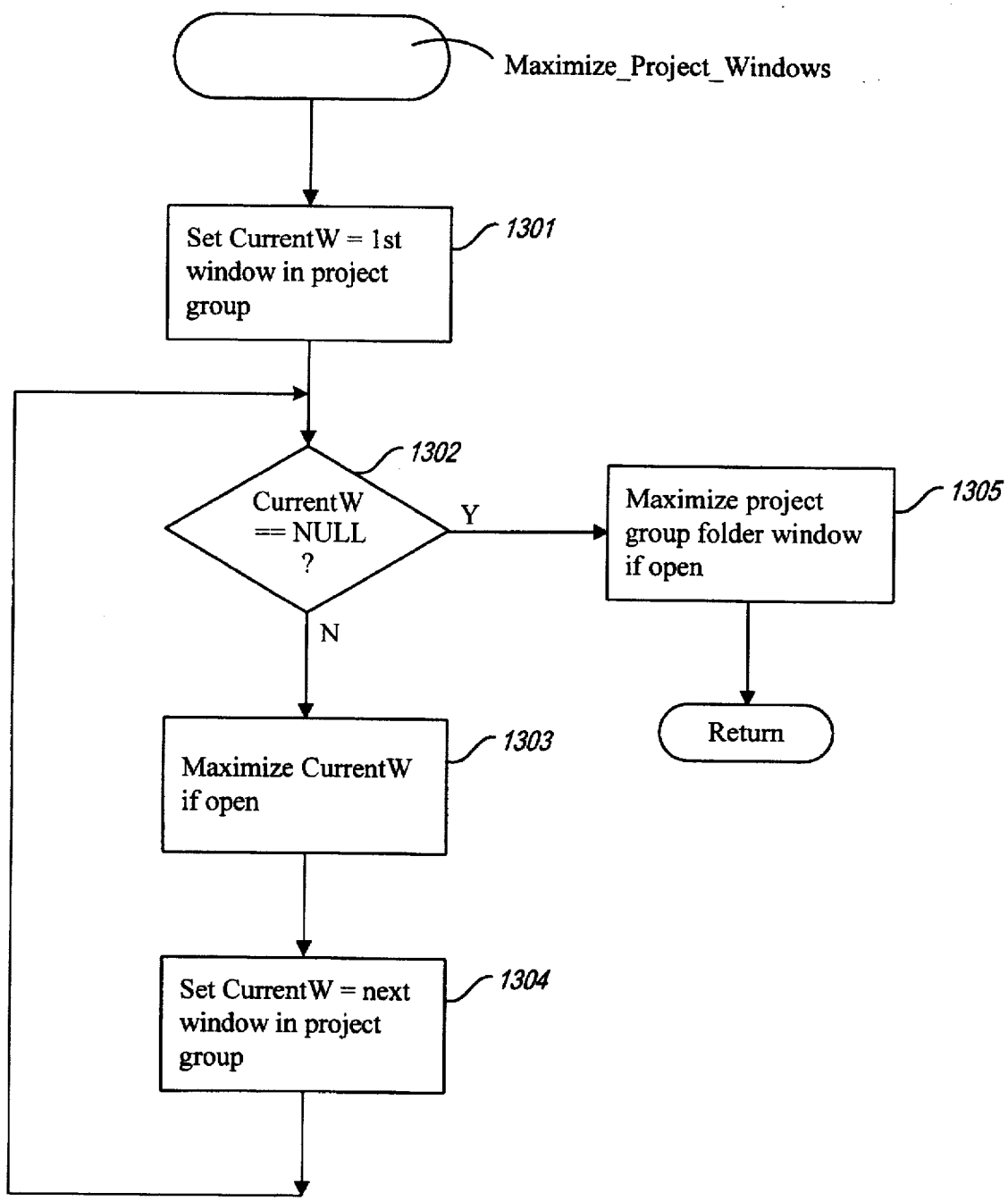
FIG. 13 is a flow diagram of the Maximize_Project_Windows routine.

FIG. 13 is a flow diagram of the Maximize_Project_ Windows routine. This routine is invoked by the message loop of the code managing the project group folder in response to the "Maximize Project" command. The Maximize_Project_Windows routine works similarly to the routines discussed above, except that it maximizes each open window belonging to the project group, including the project group folder. Specifically, in step 1301 the routine sets a temporary variable to point to the first window in the list of windows belonging to the project group. In step 1302, the routine determines whether this list has been exhausted and, if so continues at step 1305, else continues at step 1303. In step 1303, the routine maximizes the window pointed to by the temporary variable if it is in the open state. In step 1304, the routine sets the temporary pointer to point to the next window in the list of windows belonging to the project group, and returns to step maximizes the project group folder maximizes the project group folder window if it is in the open state, and returns.

Another aspect of manipulating windows as a single entity involves maintaining their relative position to other windows on the display. In particular, when a user selects a window in a project group, thereby activating the window, it may be desirable to place the other windows in the project group in a position where they are easily accessible. In one embodiment, this behavior is accomplished by maintaining the relative z-order positions of the project group windows both to each other and to the other windows displayed. The z-order position of a window refers to the window's location relative to the z-axis of the display; that is, the z-axis is a logical axis beginning at the logical planar surface of the display and extending outward toward the user sitting in front of the display. The z-order of windows is typically used by a window system to determine the order in which windows should be drawn on the display (or notified) to accurately reflect which windows obscure parts of other windows. When a window system maintains the relative z-order of the windows, this behavior implies that, when a window belonging to a project group is activated and thus moved to the topmost position in the z-order, the other windows belonging to the project group are correspondingly moved toward the user (and the topmost position) by the same amount the activated window was moved.

Figure 14A:
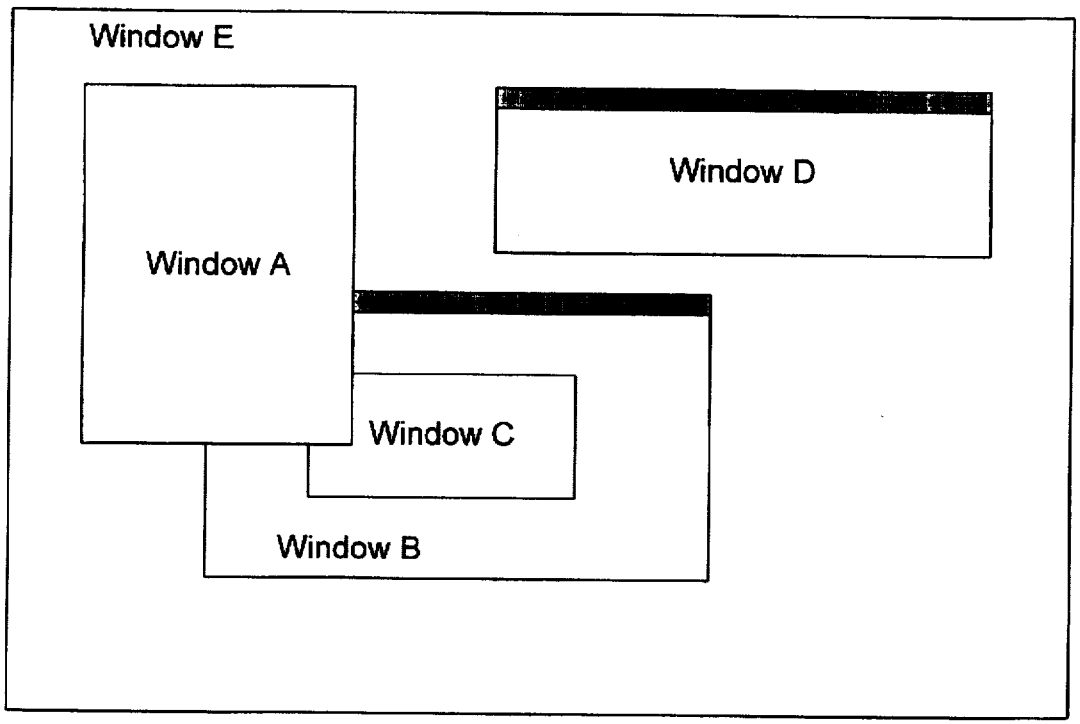
FIGS. 14A–14C are block diagrams illustrating the z-order effects of a project group.
Figure 14B:
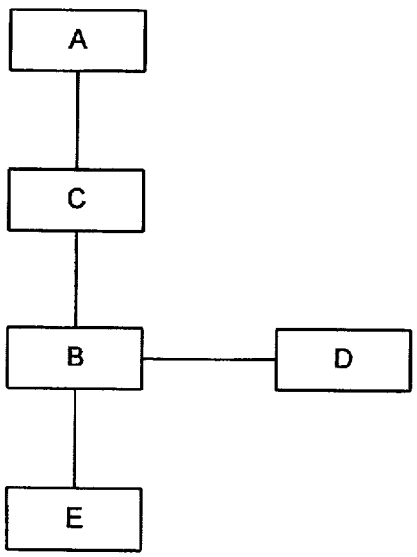
Figure 14C:
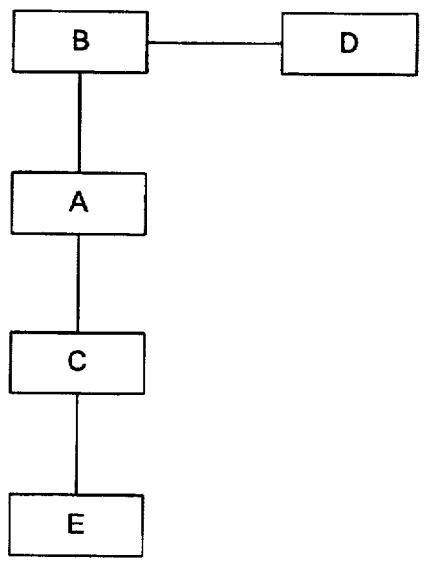

FIGS. 14A–14C are block diagrams illustrating the z-order effects of a project group. FIG. 14A shows a hypothetical display of five windows. Windows A, C, and E are not members of a project group. Windows B and D are members of the same project group. FIG. 14B shows the initial z-order of the windows depicted in FIG. 14A. Because window A obscures windows B, C, and E to some degree, Window A has been assigned the topmost position in the z-order. Window C is the next topmost window, because it obscures windows B and E. Thus, window C is given the second position toward the top of the z-order. Windows B and D only obscure window E and do not obscure each other; therefore, they occupy the same relative position in the z-order. Window E occupies the bottommost position in the z-order, because it is obscured by all the other windows.

FIG. 14C shows the effect on the z-ordering of the windows depicted in FIG. 14A when a user selects window B, thereby activating window B and bringing it to the "top." As can be seen in FIG. 14C, window B is moved two positions in the z-order to the topmost position, and window D is moved by the same number of positions. Because in this example windows B and D occupy the same position in the z-order, they both will occupy the topmost position when either window is selected by the user.

One skilled in the art will recognize that there are multiple techniques available for maintaining z-order effects. One technique involves letting the window system maintain an internal z-order list for all windows belonging to a project in a similar manner to the way it maintains the z-order for all windows. According to this technique, the window system maintains information regarding which windows belong to which project group (or has access to that information), so that when one window's position is moved within the z-order, all of the other windows associated with the same project group (if the window belongs to a project group) can be moved by the same amount. This information can be maintained in the form of a linked list. Other techniques and variations of this technique are possible.

Although the present invention has been described in terms of a preferred embodiment, it is not intended that the invention be limited to this embodiment. Equivalent methods, structures, processes, steps, and other modifications with the spirit of the invention fall within the scope of the invention. The scope of the present invention is defined by the claims which follow.

We claim:

1. A computer-implemented method for operating upon windows as an aggregate, the computer system having a display device and a window system for displaying displayable windows on the display device, each of a plurality of the displayable windows associated with a program for implementing what is displayed in the window and having associated viewing states including an open state and a closed state, and having a current state, wherein the current state represents a viewing state, wherein each viewing state provides information for setting the appearance of the associated window and for setting an execution state of the associated program, the method comprising the steps of:

grouping a plurality of windows from amongst the plurality of displayable windows into a project group, the project group having associated information regarding which windows belong to the project group;

upon receiving a request to close the project group, for each window belonging to the project group, saving the current state of the window and setting the current state of the window to the closed state, thereby setting the execution state of the associated program to a no longer executing state; and upon receiving a request to open the project group, for each window belonging to the project group, setting the current state of the window to the saved state.

2. The method of claim 1, wherein the step of grouping the plurality of windows groups a first window and a second window into the project group, wherein the first window is associated with a different program than the program associated with the second window.

3. The method of claim 2, wherein the project group has a project group appearance that differentiates the windows belonging to the project group from other windows not belonging to the project group, and wherein the step of setting the current state of the window to the saved state includes the step of setting the current state of the window to incorporate the project group appearance.

4. The method of claim 1, wherein the project group has a project group appearance that differentiates the windows belonging to the project group from other windows not belonging to the project group, and wherein the step of setting the current state of the window to the saved state includes the step of setting the current state of the window to incorporate the project group appearance.

5. The method of claim 4, wherein the step of setting the current state of the window to incorporate the project group appearance further includes the step of displaying the window with the project group appearance.

6. The method of claim 1, wherein the associated viewing states further include a minimized state, and wherein the method further comprises the step of, upon receiving a request to minimize the project group, for each window in a plurality of windows belonging to the project group, setting the current state of the window to the minimized state of the window.

7. The method of claim 6, further comprising the step of, upon receiving a request to restore the project group, for each window belonging to the project group, setting the current state of the window to the saved state of the window.

8. A computer system for grouping windows, each window having a current state that provides information for setting the appearance of the window and the execution state of an associated program for implementing what is displayed in the window, the system comprising:

a grouping mechanism for grouping a plurality of windows into a project group, wherein information is maintained in the computer system regarding which windows belong to the project group;

a saving mechanism for saving in the computer system the current state of each window belonging to the project group in response to a request to close the project group, thereby setting the execution state of the associated program to a no longer executing state; and a restoration mechanism for restoring the saved state of each window belonging to the project group in response to a request to open the project group.

9. The computer system of claim 8, wherein windows associated with different programs are grouped in the project group.

10. The computer system of claim 8, further comprising a window designation mechanism for designating a window as the project group folder, wherein the designated window provides access to requests to open and close the project group.

11. A computer-implemented method for operating upon windows as a group, the computer system having a display device and a window system for displaying displayable windows on the display device, each of a plurality of the displayable windows associated with a program for implementing what is displayed in the window and having associated viewing states including an open state and a closed state, and having a current state, wherein the current state represents a viewing state, and wherein each viewing state provides information for setting the appearance of the associated window and for setting an execution state of the associated program, the method comprising the steps of:

grouping a plurality of windows from amongst the plurality of displayable windows into a project group;

designating a window as the project group folder, the project group folder having associated information regarding which windows belong to the project group;

upon receiving a request to close the project group, for each window belonging to the project group, saving the current state of the window and setting the current state of the window to the closed state, thereby setting the execution state of the associated program to a no longer executing state; and upon receiving a request to open the project group, for each window belonging to the project group, setting the current state of the window to the saved state.

12. The method of claim 11, wherein the step of designating the window as the project group folder comprises the steps of:

determining a window to be used as the project group folder, the determined window having an associated project folder property for indicating whether the window is being used as a project group folder; and setting the associated project folder property of the determined window to indicate that the determined window is a project group folder.

13. The method of claim 12, wherein the computer system has a file system with directories and a storage device for storing the file system, and wherein the step of determining the window further comprises the step of creating a directory in the file system.

14. The method of claim 12, wherein the step of grouping the plurality of windows into the project group comprises the steps of:

providing a method to select a plurality of windows to include in the project group; and incorporating a selected plurality of windows into the designated project group folder using the provided method to select the plurality of windows.

15. The method of claim 11, wherein the project group has a project group appearance that differentiates the windows belonging to the project group from other windows not belonging to the project group, and wherein the step of setting the current state of the window to the open state further comprises the step of setting the current state of the window to incorporate the project group appearance.

16. A computer-implemented method for operating upon windows as a group, the computer system having a display device and a window system for displaying displayable windows on the display device, each of a plurality of the displayable windows associated with a program for implementing what is displayed in the window and having associated viewing states including an open state and a closed state, and having a current state, wherein the current state represents a viewing state, and wherein each viewing state provides information for setting the appearance of the associated window and for setting an execution state of the associated program, the method comprising the steps of:

providing a method to select a plurality of windows for grouping into a project group;

designating a window as the project group folder;

incorporating a selected plurality of windows into the designated project group folder using the provided method to select the plurality of windows, the project group having associated information regarding which windows belong to the project group;

upon receiving a request to close the project group, for each window belonging to the project group, saving the current state of the window and setting the current state of the window to the closed state, thereby setting the execution state of the associated program to a no longer executing state; and upon receiving a request to open the project group, for each window belonging to the project group, setting the current state of the window to the saved state.

17. The method of claim 16, wherein the step of incorporating the selected plurality of windows into the designated project group folder comprises the step of moving the selected plurality of windows into the designated project group folder.

18. The method of claim 16, wherein the step of incorporating the selected plurality of windows into the designated project group folder comprises the step of creating copies of the selected plurality of windows and moving the copies into the designated project group folder.

19. The method of claim 16, wherein the step of incorporating the selected plurality of windows into the designated project group comprises the step of inserting links to the selected plurality of windows into the designated project group folder.

20. The method of claim 16, wherein the computer system has a user input device, wherein the step of incorporating the selected plurality of windows into the designated project group folder comprises dragging the selected plurality of windows into the designated project group folder using the user input device.

21. The method of claim 16, wherein the computer system has a user input device, wherein the step of incorporating the selected plurality of windows into the designated project group folder comprises dragging a selected plurality of icons into the designated project group folder using the user input device.

22. A computer-implemented method for grouping windows, the computer system having a display device, a memory device for storing information, and a window system for displaying displayable windows on the display device, each of a plurality of the displayable windows associated with a program for implementing what is displayed in the window and having associated viewing states including an open state and a closed state, each of the plurality of the displayable windows having a current state, wherein the current state represents a viewing state, wherein each viewing state provides information for setting the appearance of the associated window and for setting an execution state of the associated program, the method comprising the steps of:

grouping a plurality of windows from amongst the plurality of displayable windows into a project group such that windows associated with different programs are grouped into the project group;

designating a window as a project group folder, the project group folder having associated information regarding which windows belong to the project group;

upon receiving a request to close the project group, for each window belonging to the project group, saving the current state of the window and setting the current state of the window to the closed state, thereby setting the execution state of the associated program to a no longer executing state; and upon receiving a request to open the project group, for each window belonging to the project group, setting the current state of the window to the saved state.

23. The method of claim 22, wherein the associated viewing states further include a minimized state, and the method further comprises the step of, upon receiving a request to minimize the project group, for each window in a plurality of windows belonging to the project group, setting the current state of the window to the minimized state of the window.

24. The method of claim 23, wherein the step of, upon receiving a request to minimize the project group, setting the current state further comprises the substep of, for each of the plurality of windows, saving the current state of the window on the memory device before setting the current state of the window to the minimized state.

25. The method of claim 22, wherein each of the plurality of displayable windows has a menu for displaying the operations to be performed relative to the window, wherein the project group has project group commands for managing the project group, and wherein the method further comprises the step of, for each window belonging the project group, adding the project group commands to the menu.

26. The method of claim 22, wherein the display device has a display surface and a logical plane corresponding to the display surface, wherein the window system has a logical z-axis perpendicular to the logical plane of the display device, wherein each of the plurality of displayable windows has an associated z-order position, the z-order position reflecting the ordering of displayed windows on the display along the logical z-axis such that a window occupying a successive position in the z-order can be obscured by a window occupying a preceding z-order position, and wherein the method further comprises the steps of:

activating a window from amongst the windows belonging to the project group;

setting the z-order position of the activated window to a topmost position relative to the logical plane of the display device; and correspondingly changing the z-order positions of the other windows belonging to the project group such that the z-order positions of the windows in the project group preceed the z-order positions of displayed windows not belonging to the project group and such that the relative z-order positions of each of the other windows in the project group remains constant.

27. The method of claim 22, wherein the step of designating the window as the project group folder comprises the steps of:
   determining a window to be used as the project group folder, the determined window having an associated project folder property for indicating whether the window is being used as a project group folder; and
   setting the associated project folder property of the determined window to indicate that the determined window is a project group folder.

28. The method of claim 27, wherein the computer system has a file system with directories and a storage device for storing the file system, and wherein the step of determining the window further comprises the step of creating a directory in the file system.

29. The method of claim 22, wherein the step of grouping the plurality of windows into the project group includes the steps of:
   providing a method to select a plurality of windows to include in the project group; and
   incorporating a selected plurality of windows into the designated project group folder using the provided method to select the plurality of windows.

30. The method of claim 29, wherein the step of designating the window as the project group folder includes the steps of:
   determining a window to be used as the project group folder, the determined window having an associated project folder property for indicating whether the window is being used as a project group folder; and
   setting the associated project folder property of the determined window to indicate that the determined window is a project group folder.

31. The method of claim 29, wherein the step of incorporating the selected plurality of windows into the designated project group folder comprises moving the selected plurality of windows into the designated project group folder.

32. The method of claim 29, wherein the step of incorporating the selected plurality of windows into the designated project group folder comprises creating copies of the selected plurality of windows and moving the copies into the designated project group folder.

33. The method of claim 29, wherein the step of incorporating the selected plurality of windows into the designated project group folder comprises inserting links to the selected plurality of windows into the designated project group folder.

34. The method of claim 29, wherein the computer system has a user input device, and wherein the step of incorporating the selected plurality of windows into the designated project group folder comprises dragging the selected plurality of windows into the designated project group folder using the user input device.

35. The method of claim 29, wherein the computer system has a user input device, and wherein the step of incorporating the selected plurality of windows into the designated project group folder comprises dragging a selected plurality of icons into the designated project group folder using the user input device.

36. The method of claim 22, wherein the associated viewing states further include a maximized state, and wherein the method further comprises the step of, upon receiving a request to maximize the project group, for a plurality of windows belonging to the project group, setting the current state of the window to the maximized state.

37. A computer system for grouping windows, each window having an associated program for implementing what is displayed in the window and having a current state that provides information for setting the execution state of the associated program, the system comprising:
   a grouping mechanism for selecting and grouping a plurality of windows to be incorporated into a project group such flint windows associated with different programs are grouped in the project group and information is maintained in the computer system regarding which windows belong to the project group;
   a window designation mechanism for designating a window as the project group folder, the designated window providing access to requests to close and open the windows belonging to the project group;
   a saving mechanism for saving in the computer system the current state of each window belonging to the project group in response to a command request to close the project group, thereby setting the execution state of the associated program to a no longer executing state; and
   a restoration mechanism for restoring the saved stale of each window belonging to the project group in response to a request to open the project group.

38. The system of claim 37, wherein the current state includes an appearance of the window, wherein the saving mechanism saves the appearance of the window as part of current state, and wherein the restoration mechanism displays the saved appearance of the window on the display.

39. A computer-implemented method for grouping windows, the computer system having a display device and a window system for displaying displayable windows on the display device, each of a plurality of the displayable windows having associated viewing states including an open state and a closed state, each of the plurality of file displayable windows associated with a program for implementing what is displayed in the window and having a current state, wherein the current state represents a viewing state, and wherein each viewing state provides information for setting the appearance of the associated window and for setting an execution state of the associated program, the method comprising the steps of:
   grouping a plurality of windows from amongst the plurality of displayable windows into a project group such that windows associated with different programs are grouped into the project group, the project group having a project group appearance that differentiates the windows belonging to the project group from other windows;
   designating a window as a project group folder, the project group folder having associated information regarding which windows belong to the project group;
   upon receiving a request to close the project group, for each window belonging to the project group, saving the current state of the window and setting current state of the window to the closed state, thereby setting the execution state of the associated program to a no longer executing slate; and
   upon receiving a request to open the project group, for each window belonging to the project group, setting the current state of the window to the saved state and displaying the window according to the current state, wherein each window that is displayed according to the open state of the windows is displayed with the project group appearance.

40. A computer-implemented method for manipulating objects as an aggregate, the computer system having a display device and software for displaying objects on the device, each object having an associated program that implements the object behavior, each object having viewing states including an open state and a closed state, and having a current state, the current state being one of the open state and the closed state, each viewing state providing information for setting the appearance of the object on the display device and for setting an execution state of the program associated with the object, the computer system having at least one container object for containing other objects, the method comprising the steps of:

designating a container object as a project group object, the project group object having a project group appearance for differentiating objects contained in the project group object from those not contained in the project group object;

grouping a plurality of objects into the project group object, each object having different programs for implementing the behavior of the object, the project group object having data for keeping track of the plurality of objects contained in the project group object;

in response to a user request to close the project group, for each object contained in the project group object, saving the current state of the object and setting the current state of the object to the closed state, thereby setting the execution state of the program associated with the object to a no longer running state;

in response to a user request to open the project group, for each object contained in the project group object, setting the current state of the object to the saved state;

determining a selected objected from among the plurality of objects; and in response to a user request to open the selected object, displaying the selected object with project group appearance.

41. The method of claim 40 wherein the step of designating the container object as the project group object further comprises the steps of:

determining a container object to be used as the project group object, the determined container object having a project folder property; and setting the project folder property of the determined container object to indicate that the determined container object is a project group object.

42. A computer-implemented method for grouping windows, the computer system having a display device with a display surface and a logical plane corresponding to the display surface and a window system for displaying displayable windows on the display device, the window system having a logical z-axis perpendicular to the logical plane of the display device, each of a plurality of the displayable windows having associated viewing states including an open state, a closed state, and a minimized state, each of the plurality of the displayable windows having a current state and a saved state, wherein the current state represents a viewing state and the saved state represents a viewing state, and wherein each viewing state provides information for determining the appearance of the window, each of the plurality of the displayable windows having an associated application for managing the contents of the window, an associated menu for displaying operations to be performed relative to the window, and an associated z-order position, the z-order position reflecting the ordering of displayed windows on the display along the logical z-axis such that a window occupying a successive position in the z-order can be obscured by a window occupying a preceding z-order position, the method comprising the steps of:

displaying windows from amongst the plurality of displayable windows on the display device;

grouping a plurality of the displayed windows into a project group, wherein windows associated with different applications are grouped into the project group, the project group having associated information regarding which windows belong to the project group, a project group appearance that differentiates the windows belonging to the project group from other windows not belonging to the project group, and a plurality of project group commands for managing the project group;

designating a window as a project group folder for providing commands to operate upon the windows belonging to the project group and for holding the project group associated information;

for a window belonging to the project group, adding indicators of the project group commands to the associated menu allowing invocation of the project group commands;

after adding the indicators of the project group commands to the associated menu, activating a window from amongst those windows belonging to the project group, wherein the z-order position associated with the activated window is set to a topmost position relative to the logical plane of the display device and the associated z-order positions of other windows belonging to the project group are correspondingly changed such that the z-order positions of the windows belonging to the project group precede the z-order positions of displayed windows not belonging to the project group and such that the relative z-order positions of the windows belonging to the project group remain constant;

displaying the menu associated with the activated window;

providing a method to select a project group command from the displayed menu;

upon a selection of a project group command to close the project group using the provided method to select the project group command, for each window belonging to the project group, saving the current state of the window as the saved state and displaying the window according to the closed state of the window;

upon a selection of a project group command to open the project group, for each window belonging to the project group, displaying the window in its saved state, wherein each window that is displayed according to the open state of the window is displayed with the project group appearance;

upon a selection of a project group command to minimize the project group, for each window belonging to the project group, saving the current state of the window as the saved state and displaying the window according to the minimized state of the window; and upon a selection of a project group command to restore the project group, for each window belonging to the project group, displaying the window in its saved state, wherein each window that is displayed according to the open state of the window is displayed with the project group appearance.

43. A computer-implemented method for grouping windows, the computer system having a display device, a memory device for storing information, and a window system for displaying displayable windows on the display device, each of a plurality of the displayable windows having a menu for displaying the operations to be performed relative to the window and having associated viewing states including an open state and a closed state, each of the plurality of the displayable windows having a current state, wherein the current state represents a viewing state, wherein each viewing state provides information for determining the appearance of the associated window, each of the plurality of the displayable windows associated with code for managing the contents of the window, the method comprising the steps of:

grouping a plurality of windows from amongst the plurality of displayable windows into a project group such that windows associated with different code are grouped into the project group, the project group having project group commands for managing the project group;

for each window belonging to the project group, adding the project group commands to the menu;

designating a window as a project group folder, the project group folder having associated information regarding which windows belong to the project group;

upon receiving a request to close the project group, for each window belonging to the project group, saving the current state of the window and setting the current state of the window to the closed state; and upon receiving a request to open the project group, for each window belonging to the project group, setting the current state of the window to the saved state.

44. A computer readable memory medium containing instructions for controlling a computer processor to operate upon windows as an aggregate, the computer system having a display device and a window system for displaying displayable windows on the display device, each of a plurality of the displayable windows associated with a program for implementing what is displayed in the window and having associated viewing states including an open state and a closed state, and having a current state, wherein the current state represents a viewing state, wherein each viewing state provides information for setting the appearance of the associated window and for setting an execution state of the associated program, by performing the steps of:

grouping a plurality of windows from amongst the plurality of displayable windows into a project group, the project group having associated information regarding which windows belong to tile project group;

upon receiving a request to close the project group, for each window is belonging to the project group, saving tile current state of the window and setting the current state of the window to the closed state, thereby setting the execution state of the associated program to a no longer executing state; and upon receiving a request to open the project group, for each window belonging to the project group, setting the current state of the window to the saved state.

45. A computer readable memory medium containing instructions for controlling a computer processor to operate upon windows as a group, the computer system having a display device and a window system for displaying displayable windows displayable windows, each of a plurality of the displayable windows associated with a program for implementing what is displayed in the window and having associated viewing states including an open state and a closed state, and having a current state, wherein the current state represents a viewing state, and wherein each viewing state provides information for setting the appearance of the associated window and for setting an execution state of the associated program, by performing the steps of:

grouping a plurality of windows from against the plurality of displayable windows into a project group;

designating a window as the project group folder, the project group folder having associated information regarding which windows belong to the project group;

upon receiving a request to close the project group, for each window belonging to the project group, saving the current state of the window and setting the current state of the window to the closed state, thereby setting the execution state of the associated program to a no longer executing state; and upon receiving a request to open the project group, for each window belonging to the project group, setting the current state of the window to the saved state.

46. A computer readable memory medium containing instructions for controlling a computer processor to operate upon windows as a group, the computer system having a display device and a window system for displaying displayable windows on the display device, each of a plurality of the displayable windows associated with a program for implementing what is displayed in the window and having associated viewing states including an open state and a closed state, and having a current state, wherein the current state represents a viewing state, and wherein each viewing state provides information for setting the appearance of the associated window and for setting an execution state of the associated program, by performing the steps of:

providing a method to select a plurality of windows for grouping into a project group;

designating a window as the project group folder;

incorporating a selected plurality of windows into the designated project group folder using the provided method to select the plurality of windows, the project group having associated information regarding which windows belong to the project group;

upon receiving a request to close the project group, for each window belonging to the project group, saving the current state of the window and setting the current state of the window to the closed state, thereby setting the execution state of the associated program to a no longer executing state; and upon receiving a request to open tile project group, for each window belonging to the project group, setting the current state of the window to the saved state.

47. A computer readable memory medium containing instructions for controlling a computer processor to group windows, the computer system having a display device and a window system for displaying displayable windows on the display device, each of a plurality of the displayable windows associated with a program for implementing what is displayed in the window and having associated viewing states including an open state and a closed state, each of the plurality of the displayable windows having a current state, wherein the current state represents a viewing state, and wherein each viewing state provides information for setting the appearance of the associated window and for setting an execution state of the associated program, by performing the steps of:

grouping a plurality of windows from amongst the plurality of displayable windows into a project group such that windows associated with different programs are grouped into the project group, the project group having a project group appearance that differentiates the windows belonging to the project group from other windows;

designating a window as a project group folder, the project group folder having associated information regarding which windows belong to the project group;

upon receiving a request to close the project group, for each window belonging to the project group, saving the current state of the window and setting the current state of the window to the closed state, thereby setting the execution state of the associated program to a no longer executing state; and upon receiving a request to open the project group, for each window belonging to the project group, setting the current state of the window to the saved state and displaying the window according to the current state, wherein each window that is displayed according to the open state of the windows is displayed with the project group appearance.

\* \* \* \* \*